US009997090B2

(12) United States Patent
Watanabe et al.

(10) Patent No.: US 9,997,090 B2
(45) Date of Patent: Jun. 12, 2018

(54) DISPLAY AND LABELED ARTICLE

(71) Applicant: TOPPAN PRINTING CO., LTD., Tokyo (JP)

(72) Inventors: Manabu Watanabe, Tokyo (JP); Mihoko Nagayoshi, Tokyo (JP); Takashi Uehara, Tokyo (JP); Hideki Ochiai, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days. days.

(21) Appl. No.: 15/018,266

(22) Filed: Feb. 8, 2016

(65) Prior Publication Data
US 2016/0152065 A1 Jun. 2, 2016

Related U.S. Application Data

(63) Continuation of application No. 13/477,739, filed on May 22, 2012, now Pat. No. 9,292,988, which is a (Continued)

(30) Foreign Application Priority Data

Nov. 27, 2009 (JP) ................................. 2009-270445

(51) Int. Cl.
*B42D 25/324* (2014.01)
*B42D 25/328* (2014.01)
(Continued)

(52) U.S. Cl.
CPC ........... *G09F 3/0292* (2013.01); *B42D 25/00* (2014.10); *B42D 25/29* (2014.10); *B42D 25/324* (2014.10);
(Continued)

(58) Field of Classification Search
CPC ............ B42D 2033/24; B42D 2033/26; B42D 25/324; B42D 25/328
See application file for complete search history.

(56) References Cited

U.S. PATENT DOCUMENTS

2006/0181077 A1\* 8/2006 Kaule .................... B42D 25/00
283/72
2007/0211317 A1 9/2007 Heim
(Continued)

FOREIGN PATENT DOCUMENTS

CN 1589205 3/2005
EP 2 077 459 A1 7/2009
(Continued)

OTHER PUBLICATIONS

Extended European Search Report dated Apr. 29, 2016 in corresponding European Patent Application No. 10833007.7.
(Continued)

*Primary Examiner* — Kyle Grabowski

(57) ABSTRACT

A display includes a first optical effect layer including a first interface part, the first interface part being provided with recesses or protrusions arranged two-dimensionally at the minimum center-to-center distance in a range of 200 nm to 500 nm, each of the recesses or protrusions having a forward-tapered shape; a reflective material layer covering at least a part of the first interface part; and a second optical effect layer including, at a position of a first portion of the first interface part that is covered with the reflective material layer, a portion that faces the reflective material layer with the first optical effect layer interposed therebetween or faces the first optical effect layer with the reflective material layer interposed therebetween, the second optical effect layer containing at least one of a cholesteric liquid crystal, a pearl pigment and a multilayer interference film.

13 Claims, 11 Drawing Sheets

Related U.S. Application Data continuation of application No. PCT/JP2010/068626, filed on Oct. 21, 2010.

(51) Int. Cl.

| | | |
|---|---|---|
| *G09F 3/00* | (2006.01) | |
| *B42D 25/369* | (2014.01) | |
| *G07D 7/12* | (2016.01) | |
| *C09D 11/106* | (2014.01) | |
| *D21H 21/40* | (2006.01) | |
| *D21H 21/48* | (2006.01) | |
| *B42D 25/425* | (2014.01) | |
| *B42D 25/29* | (2014.01) | |
| *B42D 25/355* | (2014.01) | |
| *B42D 25/00* | (2014.01) | |
| *G02B 5/00* | (2006.01) | |
| *G02B 5/18* | (2006.01) | |
| *G02B 5/28* | (2006.01) | |
| *G02B 5/30* | (2006.01) | |
| *G07D 7/00* | (2016.01) | |
| *G09F 3/02* | (2006.01) | |

(52) U.S. Cl.
CPC ......... *B42D 25/328* (2014.10); *B42D 25/355* (2014.10); *B42D 25/369* (2014.10); *B42D 25/425* (2014.10); *C09D 11/106* (2013.01); *D21H 21/40* (2013.01); *D21H 21/48* (2013.01); *G02B 5/003* (2013.01); *G02B 5/1861* (2013.01); *G02B 5/285* (2013.01); *G02B 5/3016* (2013.01); *G07D 7/003* (2017.05); *G07D 7/12* (2013.01); *B42D 2033/10* (2013.01); *B42D 2033/16* (2013.01); *B42D 2033/18* (2013.01); *B42D 2033/20* (2013.01); *B42D 2033/24* (2013.01); *B42D 2033/26* (2013.01); *B42D 2033/30* (2013.01); *B42D 2033/32* (2013.01); *B42D 2035/20* (2013.01); *B42D 2035/24* (2013.01); *G09F 2003/0277* (2013.01)

(56) References Cited

U.S. PATENT DOCUMENTS

| 2008/0272883 A1* | 11/2008 | Toda ...................... B42D 25/00 340/5.8 |
|---|---|---|
| 2009/0115185 A1* | 5/2009 | Hoffmuller ............ B42D 25/29 283/85 |
| 2010/0045024 A1* | 2/2010 | Attner ................... B42D 25/29 283/72 |
| 2010/0177391 A1 | 7/2010 | Yashiki et al. |
| 2011/0012337 A1 | 1/2011 | Heim |

FOREIGN PATENT DOCUMENTS

| JP | 6-286318 | 10/1994 |
|---|---|---|
| JP | 9-267592 | 10/1997 |
| JP | 11-58581 | 3/1999 |
| JP | 2007-3673 | 1/2007 |
| JP | 2007-108206 | 4/2007 |
| JP | 2008-107470 | 5/2008 |
| JP | 2008-137232 | 6/2008 |
| JP | 2009-34945 | 2/2009 |
| JP | 2009-80201 | 4/2009 |
| JP | 2009-86648 | 4/2009 |
| JP | 2009-109871 | 5/2009 |
| TW | 200816094 | 4/2008 |
| WO | WO 2009/038197 A1 | 3/2009 |
| WO | WO 2009/109291 A1 | 9/2009 |

OTHER PUBLICATIONS

International Preliminary Report on Patentability mailed Jul. 19, 2012 for corresponding International Application No. PCT/JP2010/068626.
International Search Report for PCT/JP2010/068626 mailed Jan. 18, 2011.
Taiwanese Office Action issue on Jul. 24, 2013 in corresponding Taiwanese Patent Application No. 099136310 filed on Oct. 25, 2013.
U.S. Restriction Requirement dated Jun. 11, 2014 from parent U.S. Appl. No. 13/477,739.
U.S. Office Action dated Oct. 30, 2014 from parent U.S. Appl. No. 13/477,739.
U.S. Office Action dated Mar. 18, 2015 from parent U.S. Appl. No. 13/477,739.
U.S. Advisory Action dated Jul. 8, 2015 from parent U.S. Appl. No. 13/477,739.
U.S. Notice of Panel Decision dated Sep. 14, 2015 from parent U.S. Appl. No. 13/477,739.
U.S. Notice of Allowance dated Nov. 6, 2015 from parent U.S. Appl. No. 13/477,739.
U.S. Appl. No. 13/477,739, filed May 22, 2012, Manabu Watanabe, Toppan Printing Co., Ltd.
Japanese Office Action for Japanese Application No. 2016-117151 dated Aug. 22, 2017.
European Office Action for European Application No. 10833007.7-1704 dated Aug. 11, 2017.
Rudolf L. van Renesse: "Optical Document Security (Third Edition)", 2005, Artech House, Boston, 3 pp.

* cited by examiner

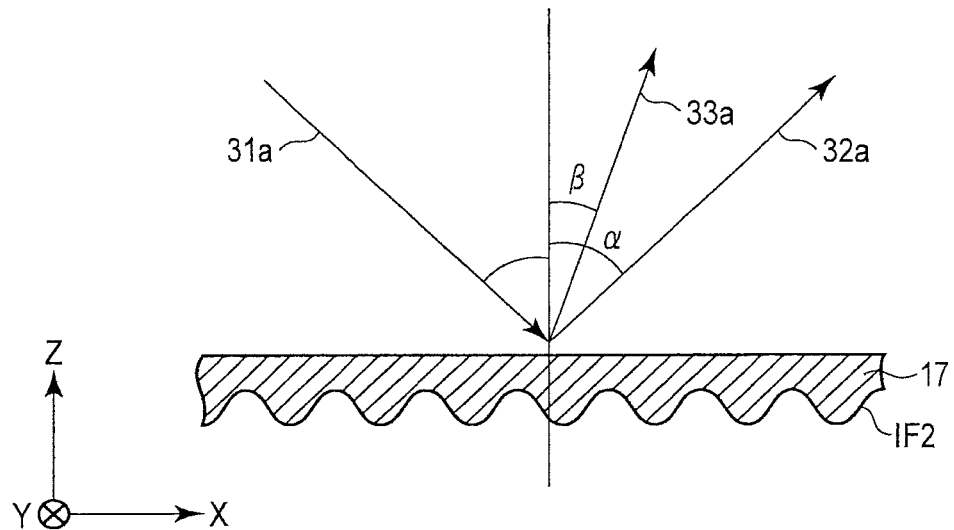
F I G. 5
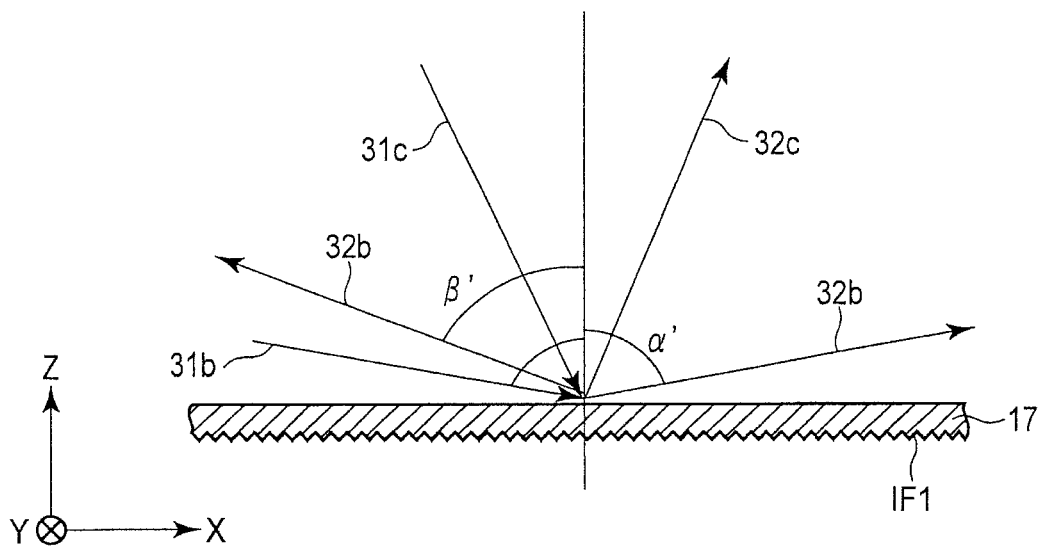
F I G. 6

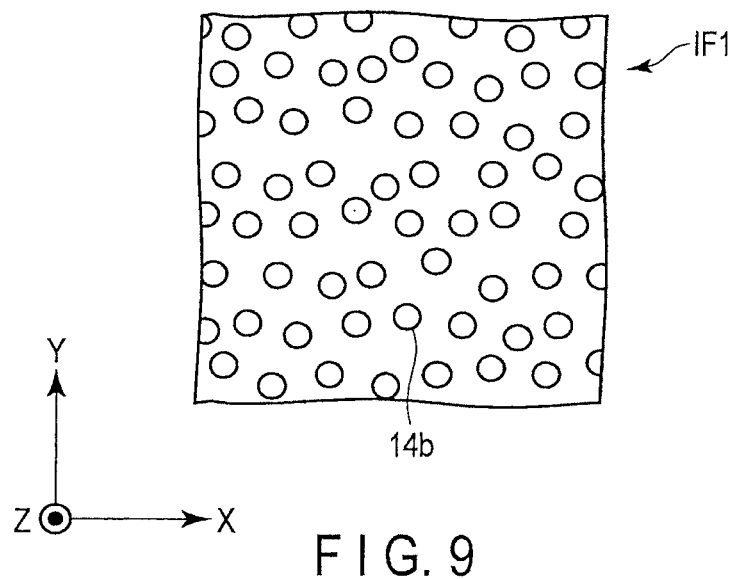
F I G. 9
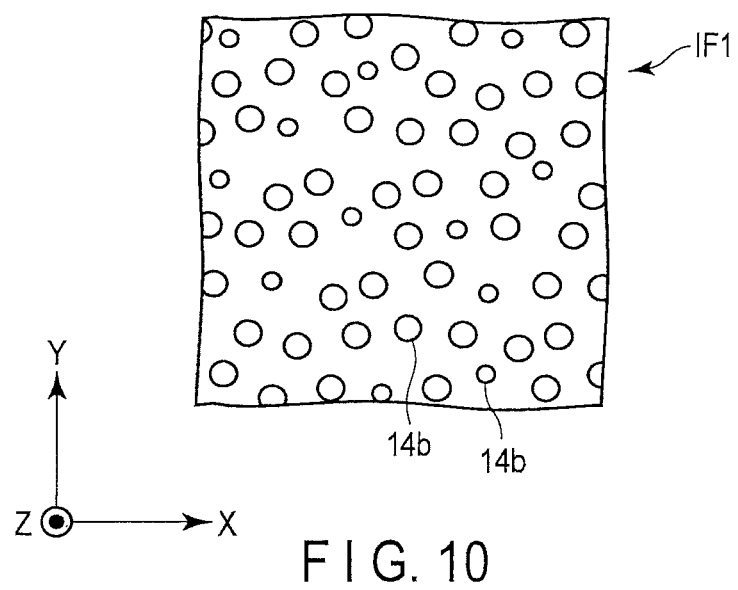
F I G. 10

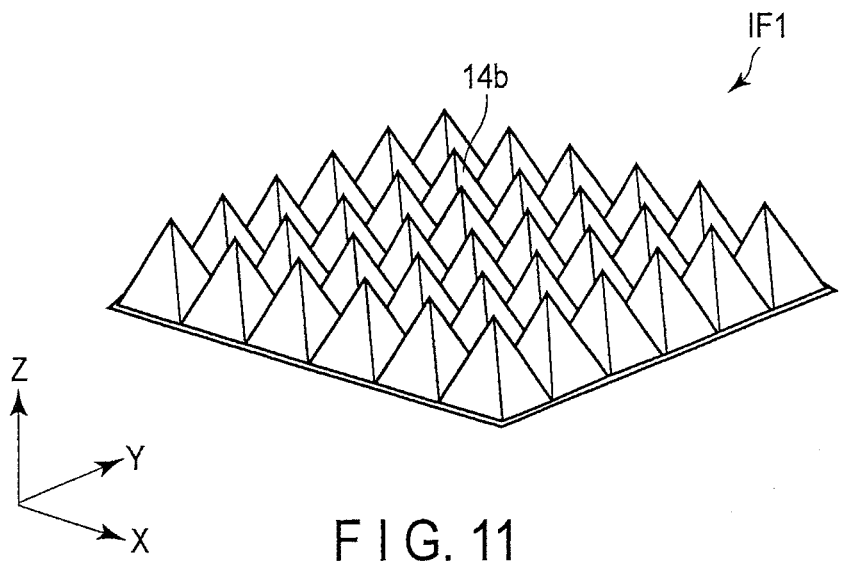
F I G. 11
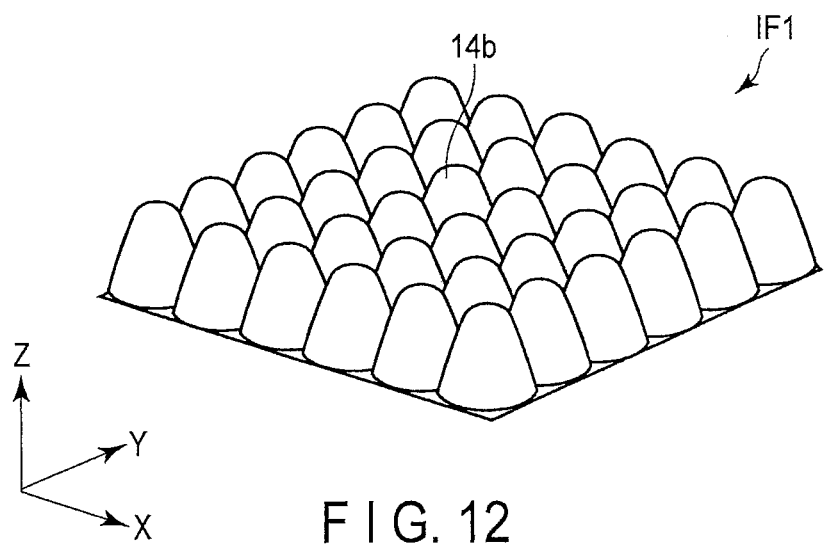
F I G. 12

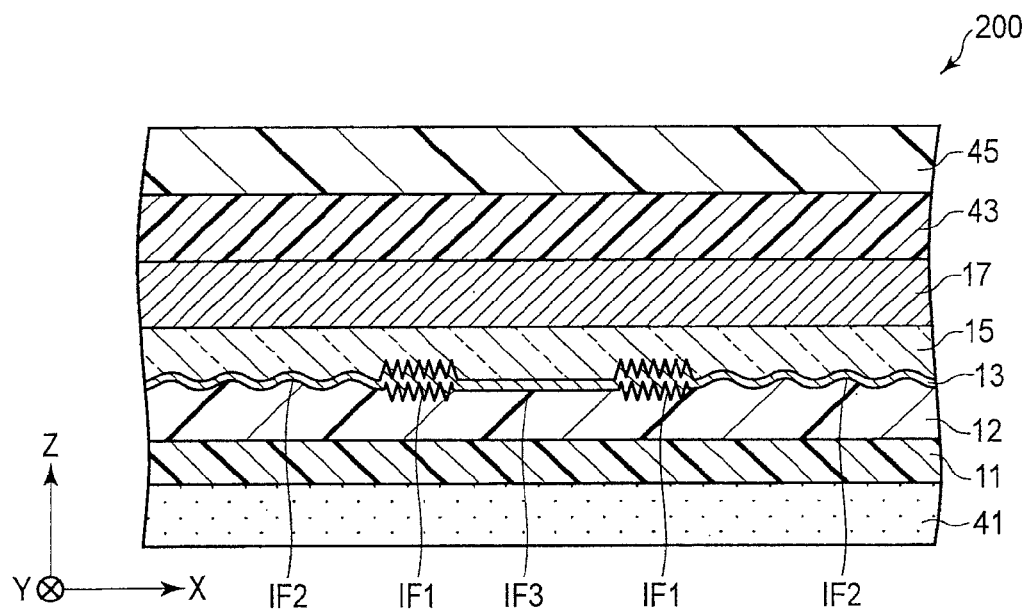
F I G. 17
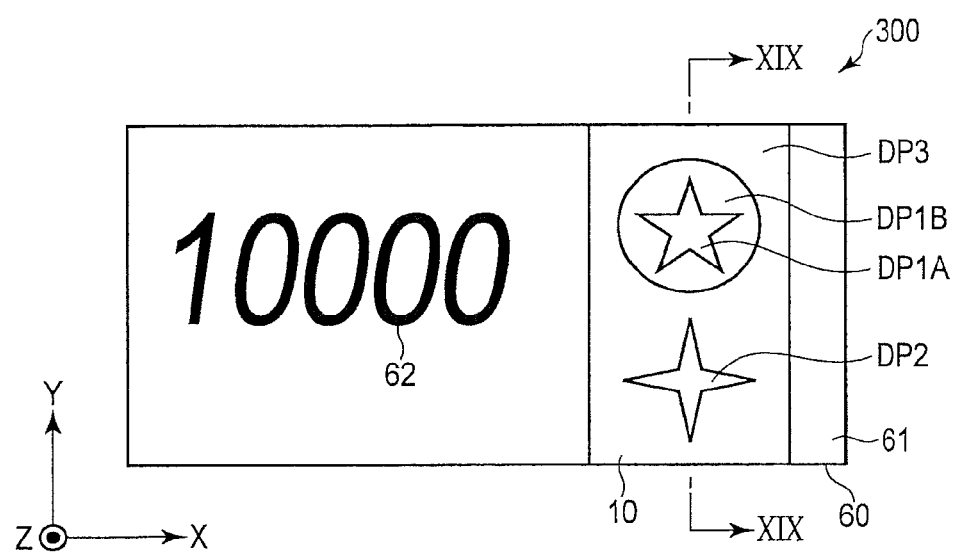
F I G. 18

DISPLAY AND LABELED ARTICLE

CROSS-REFERENCE TO RELATED APPLICATIONS

This application is a continuation of U.S. patent application Ser. No. 13/477,739, filed on May 22, 2012, which is currently pending and is a Continuation application of PCT Application No. PCT/JP2010/068626, filed Oct. 21, 2010 and based upon and claiming the benefit of foreign priority from prior Japanese Patent Application No. 2009-270445, filed Nov. 27, 2009, the entire contents of all of which are incorporated herein by reference.

BACKGROUND

1. Field

The present invention relates to an optical technique that offers, for example, forgery prevention effect, decorative effect and/or aesthetic effect.

2. Related Art

Articles such as securities, certificates, brand goods, media for personal authentication, etc. are required to be difficult to forge. Thus, in some cases, a display excellent in forgery prevention performance is provided on such articles.

Most of the displays include a microstructure such as diffraction grating, hologram, lens array, etc. The microstructures are hard to analyze. Further, in order to manufacture a display including the microstructure, an expensive manufacturing apparatus such as electron beam writer or the like is necessary. For these reasons, the displays like this can achieve an excellent performance in forgery prevention.

For example, the patent literature 1 describes a display that includes first and second interface parts. The first interface part is provided with grooves as a relief-type diffraction grating. The second interface part is provided with recesses or protrusions which are disposed two-dimensionally with a center-to-center distance smaller than the minimum center-to-center distance of the grooves and each of which has a forward tapered shape. The display has a fine structure and special optical characteristics. Accordingly, the display has an excellent performance in forgery prevention.

PRIOR ART DOCUMENT

Patent Literature

Patent Literature 1: Jpn. Pat. Appln. KOKAI Publication No. 2008-107470

SUMMARY

An object of the present invention is to realize a higher forgery prevention effect.

According to a first aspect of the present invention, there is provided a display comprising a first optical effect layer including a first interface part, the first interface part being provided with recesses or protrusions arranged two-dimensionally at the minimum center-to-center distance in a range of 200 nm to 500 nm, each of the recesses or protrusions having a forward-tapered shape, a reflective material layer covering at least a part of the first interface part, and a second optical effect layer including, at a position of a first portion of the first interface part that is covered with the reflective material layer, a portion that faces the reflective material layer with the first optical effect layer interposed therebetween or faces the first optical effect layer with the reflective material layer interposed therebetween, the second optical effect layer containing at least one of a cholesteric liquid crystal, a pearl pigment and a multilayer interference film.

According to a second aspect of the present invention, there is provided a labeled article comprising a substrate, and the display according to the first aspect supported by the substrate.

BRIEF DESCRIPTION OF THE DRAWINGS

FIG. 5 is a diagram schematically showing an optical effect offered by a portion of the display shown in FIGS. 1 and 2 that corresponds to the second interface part;

FIG. 6 is a diagram schematically showing an optical effect offered by a portion of the display shown in FIGS. 1 and 2 that corresponds to the first interface part;

FIG. 9 is plan views schematically showing an example of arrangement patterns of recesses or protrusions adoptable in the first interface part;

FIG. 10 is plan views schematically showing an example of arrangement patterns of recesses or protrusions adoptable in the first interface part;

FIG. 11 is an enlarged perspective view showing another example of the structure adoptable in the first interface part IF1 of the display shown in FIGS. 1 and 2;

FIG. 12 is an enlarged perspective view showing another example of the structure adoptable in the first interface part IF1 of the display shown in FIGS. 1 and 2;

FIG. 17 is a sectional view schematically showing a transfer foil according to an embodiment of the invention;

FIG. 18 is a plan view schematically showing an example of a labeled article;

DESCRIPTION OF EMBODIMENTS

Figure 1:
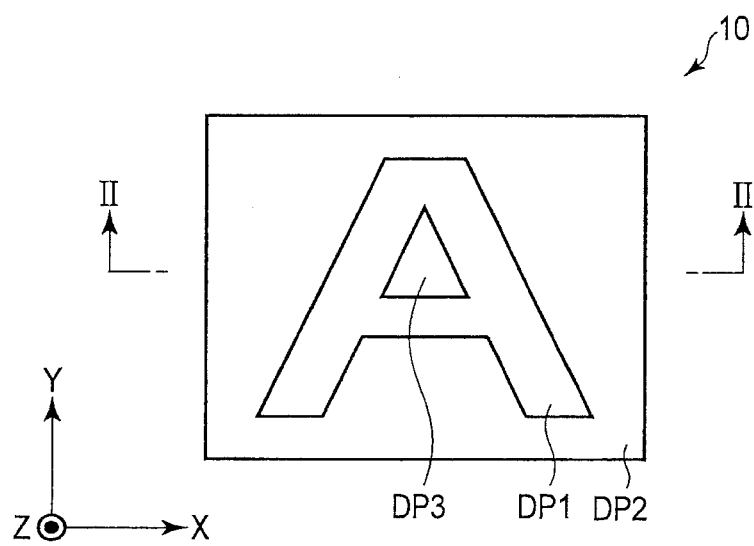
FIG. 1 is plan view schematically showing a display according to an embodiment of the present invention.

Embodiments of the present invention will be described below with reference to drawings. In the drawings, the same reference symbols denote components having the same or similar functions and duplicate descriptions will be omitted.

Figure 2:
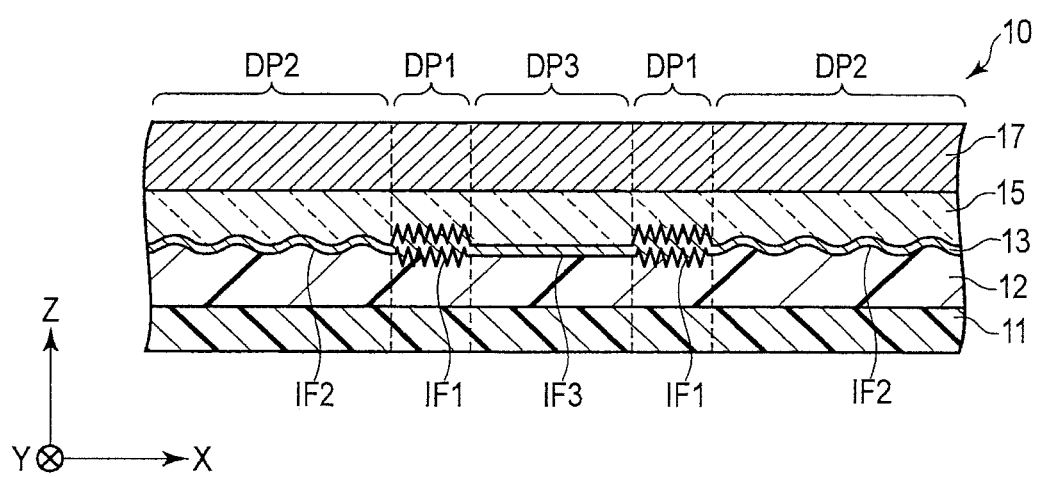
FIG. 2 is a sectional view taken along a II-II line of the display shown in FIG. 1.

FIG. 1 is plan view schematically showing a display according to an embodiment of the present invention. FIG. 2 is a sectional view taken along a II-II line of the display shown in FIG. 1. In FIGS. 1 and 2, directions in parallel with a main surface of the display 10 and orthogonal to each other are assigned as a X direction and a Y direction, and a direction perpendicular to the main surface of the display 10 is assigned as a Z direction.

The display 10 includes, as shown in FIG. 2, a substrate 11, a first optical effect layer 12, a reflective material layer 13, a light-transmitting layer 15, and a second optical effect layer 17. An interface between the first optical effect layer 12 and the reflective material layer 13 includes a first interface part IF1, a second interface part IF2, and a third interfacial part IF3. As will be described later, the first interface part IF1 is provided with a plurality of recesses or protrusions, and the second interface part IF2 is provided with a plurality of grooves.

Hereinafter, a portion of the first interface part IF1 that is covered with the reflective material layer 13 is referred to as a first region. Further, a portion of the second interface part IF2 that is covered with the reflective material layer 13 is referred to as a second region. Still further, a portion of the third interface part IF3 that is covered with the reflective material layer 13 is referred to as a third region.

In addition, hereinafter, a portion of the display 10 that corresponds to the first region is referred to as a display part DP1. Further, a portion of the display 10 that corresponds to the second region is referred to as a display part DP2. Still further, a portion of the display 10 that corresponds to the third region is referred to as a display part DP3.

A substrate 11 is, typically, a sheet or film of a resin. Examples of the resin include polyethylene terephthalate, polyethylene naphthalate, polycarbonate, triacetylcellulose, polypropylene, polymethyl methacrylate, acryl-styrene copolymer and vinyl chloride. The substrate 11 may be omitted.

The first optical effect layer 12 is formed on the substrate 11. The first optical effect layer 12 has, typically, light-transmitting properties. Examples of materials of the first optical effect layer 12 include resins such as thermoplastic resins, thermosetting resins, and UV- or electron beam-curable resins (hereinafter, also referred to as photo-curable resin). When a thermoplastic resin, a thermosetting resin or a photo-curable resin is used as a material of the first optical effect layer 12, by transfer with an original plate, a recess structure and/or a protrusion structure can be readily formed on one main surface.

Examples of the thermoplastic resins with light-transmitting properties include polyethylene terephthalate, polyethylene naphthalate, polycarbonate, cellulose acetate, cellulose acetate lactate, cellulose acetate propionate, nitrocellulose, polyethylene, polypropylene, acryl-styrene copolymer, vinyl chloride and polymethyl methacrylate.

Examples of the thermosetting resins with light-transmitting properties include polyimide, polyamide, polyester urethane, acrylic urethane, epoxy urethane, silicone, epoxy and melamine resins.

The photo-curable resin is a resin that is cured by irradiating with light such as UV-rays or electron beams. As a typical resin that causes a radical polymerization by light irradiation, an acrylic resin having an acryloyl group in a molecule can be cited. For example, an epoxy acrylate-based, urethane acrylate-based, polyester acrylate-based or polyol acrylate-based oligomer or polymer, a monofunctional, bifunctional or polyfunctional polymerizable (meth)acryl-based monomer (for example, tetrahydrofurfuryl acrylate, 2-hydroxyethyl acrylate, 2-hydroxy-3-phenoxypropyl acrylate, polyethylene glycol diacrylate, polypropylene glycol diacrylate, tri methylolpropane triacrylate, pentaerythritol triacrylate or pentaerythritol tetraacrylate) or an oligomer or a polymer thereof, or a mixture thereof can be used.

When a photo-curable resin is used as the material of the first optical effect layer 12, in this layer, a photopolymerization initiator may be further contained. Examples of the photopolymerization initiators include benzophenone, diethyl thioxanthone, benzyl dimethyl ketal, 2-hydroxy-2-methyl-1-phenylpropan-1-one, 1-hydroxycyclohexyl phenyl ketone, 2-methyl-1-[4-(methylthio)phenyl]-2-morpholino propane-1 and acylphosphine oxide. However, the photopolymerization initiator does not react at 100% efficiency and an unreacted photopolymerization initiator may adversely affect on the performance. Accordingly, it is preferable that an amount of the photopolymerization initiator with respect to a photo-curable resin is in the range of, for example, 0.1 to 7% by mass, typically, 0.5 to 5% by mass so that uncured portions do not remain.

On one main surface of the first optical effect layer 12, the interface parts IF1 to IF3 are disposed. The structures and optical characteristics of the interface parts IF1 to IF3 will be described in detail later. One or both of the second interface part IF2 and the third interface part IF3 may be omitted.

The reflective material layer 13 covers at least a part of the interface part IF1. FIGS. 1 and 2 show, as an example, a case where the reflective material layer 13 covers entirely the interface parts IF1 to IF3.

As the reflective material layer 13, for example, a metal or alloy layer made of a metal material such as aluminum, silver, tin, chromium, nickel, copper, gold or alloys thereof can be used. In this case, the reflective material layer 13 is typically formed by use of a vacuum film-forming method. As the vacuum film-forming method, for example, a vacuum evaporation method and a sputtering method can be cited. A thickness of the reflective material layer 13 is set, for example, in the range of 1 nm to 100 nm.

The reflective material layer 13 plays a role of allowing the display 10 to display an image excellent in visibility. Further, by providing the reflective material layer 13, it becomes difficult to damage the recess structure and/or protrusion structure disposed on the main surface of the first optical effect layer 12.

The light-transmitting layer 15 is interposed between the reflective material layer 13 and the second optical effect layer 17. The light-transmitting layer plays a role of enhancing the adhesiveness between the layers.

The light-transmitting layer 15 has light-transmitting properties, and, typically, is transparent. Examples of the materials of the light-transmitting layer 15 include vinyl acetate resin, ethylene-vinyl acetate copolymer resin, polyester resin, polyester urethane resin, acryl urethane resin, epoxy resin, epoxy urethane resin, polycarbonate urethane resin, butyral resin, and propylene chloride resin. The light-transmitting layer 15 may be omitted.

The second optical effect layer 17 includes a portion that faces the first optical effect layer 12 with the reflective material layer 13 interposed therebetween at a position of a first portion of the interface part IF1 that is covered with the reflective material layer 13. FIGS. 1 and 2 show, as an example, a case where the second optical effect layer 17 faces an entirety of the first optical effect layer 12 with the reflective material layer 13 interposed therebetween.

The second optical effect layer 17 includes at least one of a cholesteric liquid crystal, a pearl pigment, and a multilayer interference film.

When the second optical effect layer 17 includes a cholesteric liquid crystal, the second optical effect layer 17 can be manufactured with, for example, a material containing a compound having a cholesteric structure, or, a material containing a compound to which a cholesteric structure is imparted by adding a chiral agent to a nematic liquid crystal. In the cholesteric liquid crystal, for example, by changing an amount and a kind of the chiral agent added to the nematic liquid crystal, the helical pitch thereof and a twist direction of a polarization plane can be changed. Further, at both ends of liquid crystal molecule, a polymerizable group such as an acryl group or the like can be introduced. When thus implemented, after each of liquid crystal molecules is aligned, the alignment thereof can be readily fixed.

When the second optical effect layer 17 includes the cholesteric liquid crystal, the second optical effect layer 17 may be a layer of a cholesteric liquid crystal or a layer containing a cholesteric liquid crystal pigment.

When the second optical effect layer 17 is a layer of the cholesteric liquid crystal, the light scattering in the second optical effect layer 17 can be suppressed to the minimum.

When the second optical effect layer 17 is a layer containing the cholesteric liquid crystal pigment, the second optical effect layer 17 contains typically powder of the cholesteric liquid crystal and a transparent binder. In this case, for example, by using a plurality of the cholesteric liquid crystal pigments mutually different in the helical pitch and twist direction, the optical characteristics of the second optical effect layer 17 can be fine-tuned.

When the second optical effect layer 17 contains the cholesteric liquid crystal, upon illuminating the second optical effect layer 17, the second optical effect layer 17 can emit selective reflected light having circularly-polarized properties. Hereinafter, it is assumed that an axis of orientation of the cholesteric liquid crystal is in nearly parallel with a main surface of the display 10.

When a helical pitch of the cholesteric liquid crystal is P, an incident angle with respect to an axis in parallel with a main surface of the display 10 is e, and a wavelength of reflected light is λ, it is known that the following equation is satisfied.

$$2P \cdot \sin \theta = n\lambda (n=1,2,3,\ldots)$$

According to the equation, for example, when white light is incident vertically to the second optical effect layer 17, that is, in the case of θ=90°, a regularly reflected light having a wavelength of twice the helical pitch P is emitted vertically to the second optical effect layer 17.

For example, when a cholesteric liquid crystal having the helical pitch P of 280 nm is used, the second optical effect layer 17 can emit a light (wavelength λ=560 nm) corresponding to a green hue. Alternatively, when a cholesteric liquid crystal having the helical pitch P of 360 nm is used, the second optical effect layer 17 can emit a light (wavelength=720 nm) corresponding to a red hue. Like this, by varying the helical pitch P of the cholesteric liquid crystal, the optical characteristics of the second optical effect layer 17 containing the cholesteric liquid crystal can be varied.

When the incident angle θ of the illumination light is made gradually smaller, a wavelength of a light emitted from the second optical effect layer 17 becomes gradually shorter, and, finally, shorter than the shortest wavelength of visible range. That is, by practicing like this, a hue of the emitted light varies from red to green, from green to blue, and finally, the emitted light becomes unrecognizable. For example, in the case where a cholesteric liquid crystal having the helical pitch P of 360° is used, when an incident angle θ is set at 30° (60° with respect to a normal line direction of a main surface of the display 10), a wavelength of selectively reflected light is 360 nm. Accordingly, in this case, an observer can not recognize visual effects due to the second optical effect layer 17 or is very difficult to recognize.

The second optical effect layer 17 containing a cholesteric liquid crystal can be formed, for example, as follows.

According to the first method, firstly, a stretched film made of, for example, polyethylene terephthalate, polypropylene, nylon, cellophane, polyvinyl alcohol or the like is prepared. The stretched film may be rubbed. Then, a coating liquid is prepared by dissolving a raw material of a cholesteric liquid crystal in an organic solvent. Subsequently, the stretched film is coated with the coating liquid. Thereafter, the resulted coated film is dried. Thereby, on the stretched film, liquid crystal molecules are aligned. Then, in this state, it is illuminated with UV-ray to fix the alignment of the liquid crystal molecules. Thus, a cholesteric liquid crystal-forming film is obtained.

Next, a transfer-receiver, for example, one main surface of the first optical effect layer 12 or the reflective material layer 13 is coated with an adhesive having light-transmitting properties. Subsequently, the cholesteric liquid crystal-forming film is adhered thereto. Then, only the stretched film is peeled therefrom. Thus, on a transfer-receiver, for example, one main surface of the first optical effect layer 12 or the reflective material layer 13, a second optical effect layer 17 containing a cholesteric liquid crystal is formed.

According to the second method, firstly, a main surface on which the second optical effect layer 17 is formed, for example, one main surface of the first optical effect layer 12 or the reflective material layer 13 is coated with an optical alignment ink. Thereafter, the coated film is dried and illuminated with polarizing UV-ray to form an alignment film. Then, a raw material of cholesteric liquid crystal is dissolved in an organic solvent to prepare a coating liquid, and the alignment film is coated with the coating liquid. Thereafter, the resulted coated film is dried to align liquid crystal molecules. Then, in this state, it is illuminated with UV-ray to fix the alignment of the liquid crystal molecules. Thus, the second optical effect layer 17 containing the cholesteric liquid crystal is obtained. In this case, when the adhesiveness between a main surface on which the second optical effect layer 17 is formed and the alignment film of an optical alignment ink is insufficient, an anchoring layer may be further disposed.

In the above, a method where the liquid crystal molecules are aligned with an alignment film was described, a method of aligning liquid crystal molecules is not restricted to the method. For example, liquid crystal molecules may be aligned by application of an electric field and/or a magnetic field or by application of shear stress.

Further, in the above, a method of fixing the alignment of the liquid crystal molecules by UV-ray illumination was described. However, a method of fixing the alignment of the liquid crystal molecules is not restricted thereto. For example, the alignment of the liquid crystal molecules may be fixed by quenching a layer containing the liquid crystal molecules. Among these methods, a method of fixing the alignment of the liquid crystal molecules by UV-ray illumination is more preferred.

Form the viewpoint of the production cost of the display 10, among the first and second methods mentioned above, typically, the first method is adopted.

When the second optical effect layer 17 contains a pearl pigment, the second optical effect layer 17 may contain, for example, a layered substance in a form of powder such as mica or the like, or powder obtained by coating the layered substance with a covering material such as reduced titanium dioxide, iron oxide or the like. Alternatively, in this case, the second optical effect layer 17 may contain powder obtained by pulverizing a multilayer interference film described below. When the second optical effect layer 17 contains the pearl pigment, the second optical effect layer 17 further contains typically a transparent binder.

When the second optical effect layer 17 contains the pearl pigment, the second optical effect layer 17 is formed typically by a printing method or a coating method. As the printing method or coating method, well known methods can be adopted.

A multilayer interference film that the second optical effect layer 17 can contain is formed by stacking a plurality of layers having refractive indices different from each other. Each of the layers constituting the multilayer interference film is, for example, a metal thin film, a ceramic thin film, or an organic polymer thin film. The multilayer interference film contains, for example, an alternate laminate of layers having refractive indices different from each other. For example, when a ceramic thin film or a metal thin film having the light transmittance in the range of 20 to 70%, and an organic polymer thin film are alternately stacked at a predetermined thickness, a multilayer interference film that absorbs or reflects only a visible light having a specific wavelength can be obtained.

Examples of materials that can be adopted for the respective layers that form the multilayer interference film will be described below. A numerical value within parentheses following a chemical formula or a name of chemical compound is the refractive index of the compound.

Ceramics: $Sb_2O_3$ (3.0), $Fe_2O_3$ (2.7), $TiO_2$ (2.6), CdS (2.6), $CeO_2$ (2.3), ZnS (2.3), $PbCl_2$ (2.3), CdO (2.2), $Sb_2O_3$ (2.0), $WO_3$ (2.0), SiO (2.0), $Si_2O_3$ (2.5), $In_2O_3$ (2.0), PbO (2.6), $Ta_2O_3$ (2.4), ZnO (2.1), $ZrO_2$ (2.0), MgO (1.6), $Si_2O_2$ (1.5), $MgF_2$ (1.4), $CeF_3$ (1.6), $CaF_2$ (1.3 to 1.4), $AlF_3$ (1.6), $Al_2O_3$ (1.6) and GaO (1.7).

Metal: Al, Fe, Mg, Zn, Au, Ag, Cr, Ni, Cu, Si, and alloys thereof.

Organic polymer: polyethylene (1.51), polypropylene (1.49), polytetrafluoroethylene (1.35), polymethyl methacrylate (1.49), and polystyrene (1.60).

When the second optical effect layer 17 contains the multilayer interference film, the second optical effect layer 17 can be formed by use of a known method that can control a film thickness, a film-forming speed, the number of laminated layers and an optical film thickness. Examples of such methods include a vacuum evaporation method, a sputtering method and a chemical vapor deposition method (CVD method). The optical film thickness means a product of the refractive index and a film thickness.

Alternatively, the multilayer interference film may be a multilayer film formed by coextrusion of multiple layers. The multilayer film thus obtained is an alternate laminate of a plurality of plastic thin films having the refractive indices different from each other. Each of the plastic thin films contains a plastic material. Each of the plastic thin films may further contain an additive as required.

The multilayer film contains, for example, an alternate laminate of plastic thin films having the refractive indices different from each other. Examples of the materials of the plastic thin films include polyethylene naphthalate (1.63), polycarbonate (1.59), polystyrene (1.59), polyethylene terephthalate (1.58), nylon (1.53), polymethyl methacrylate (1.49), polymethyl pentene (1.46) and fluorinated polymethyl methacrylate (1.4). It is particularly preferable to use an alternate laminate of a thin film of polyethylene naphthalate (1.63) and a thin film of polyethylene terephthalate (1.58) as the multilayer film.

In the case where the second optical effect layer 17 contains the multilayer interference film, compared with the case where the second optical effect layer 17 contains the cholesteric liquid crystal or the pearl pigment, the crack resistance of the display 10 is higher. Further, in the case where the second optical effect layer 17 contains the multilayer interference film, compared with the case where the second optical effect layer 17 contains the cholesteric liquid crystal, the light resistance of the display 10 is higher. In addition, in the case where the second optical effect layer 17 contains the multilayer interference film, compared with the case where the second optical effect layer 17 contains the cholesteric liquid crystal or the pearl pigment, the production cost of the display 10 is lower.

The second optical effect layer 17 varies in color depending on an observation angle. The optical characteristics due to a combination of the second optical effect layer 17, the first optical effect layer 12, and the reflective material layer 13 will be display part later.

Figure 3:
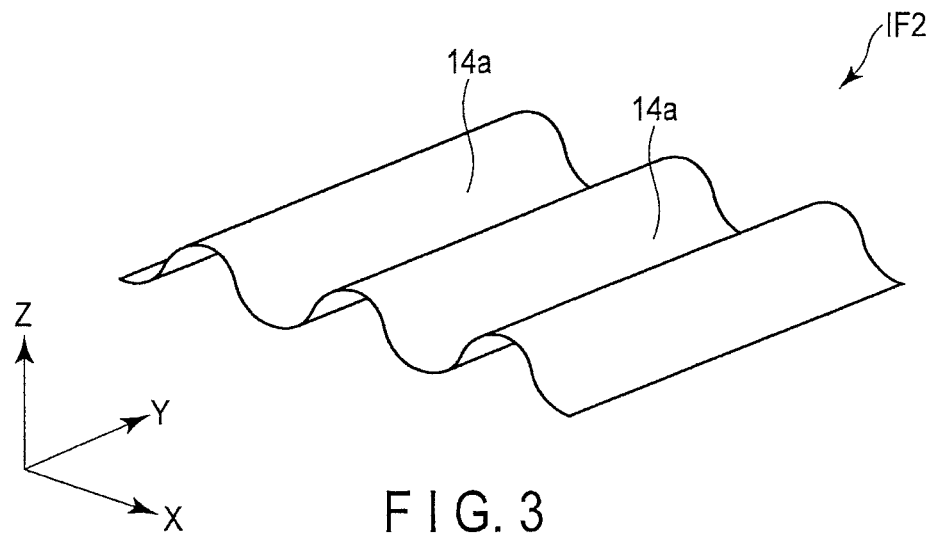
FIG. 3 is an enlarged perspective view showing an example of a structure adoptable in the second interface part of the display shown in FIGS. 1 and 2.
Figure 4:
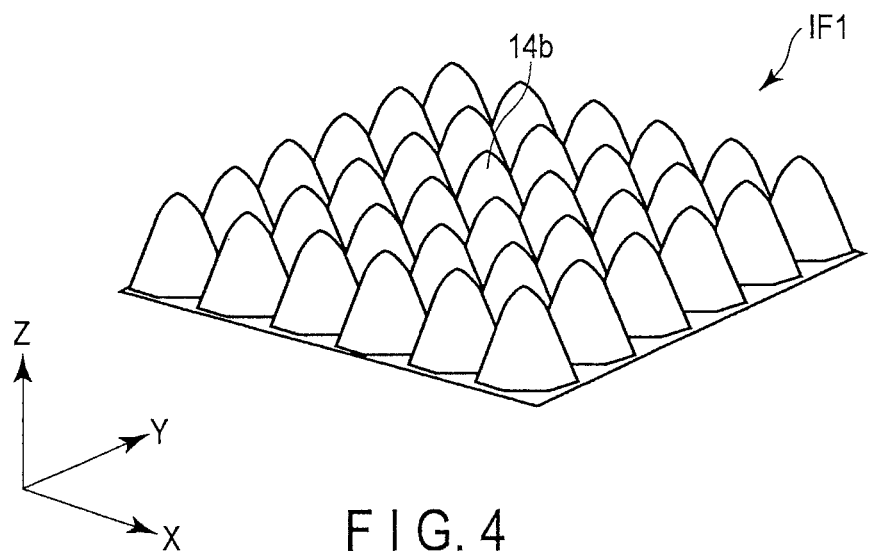
FIG. 4 is an enlarged perspective view showing an example of a structure adoptable in the first interface part of the display shown in FIGS. 1 and 2.

FIG. 3 is an enlarged perspective view showing an example of a structure adoptable in the second interface part of the display shown in FIGS. 1 and 2. FIG. 4 is an enlarged perspective view showing an example of a structure adoptable in the first interface part of the display shown in FIGS. 1 and 2.

The second interface part IF2 is provided with a relief-type diffraction grating configured by disposing a plurality of grooves 14a. The minimum center-to-center distance of the grooves 14a is larger than the minimum center-to-center distance of the plurality of recesses or protrusions 14b described later. The minimum center-to-center distance of the grooves 14a is, for example, the shortest wavelength of visible range or more, typically, in the range of 0.5 µm to 2 µm. Further, a depth of the groove 14a is, for example, in the range of 0.05 µm to 1 µm, typically, in the range of 0.05 µm to 0.3 µm. The second interface part IF2 may be omitted.

The term "diffraction grating" means a structure that generates a diffracted light by illuminating with an illumination light such as natural light, and encompasses, in addition to an ordinary diffraction grating where a plurality of grooves 14a is arranged in parallel and at an equidistance, an interference pattern recorded in a hologram. Further, a groove 14a or a portion sandwiched between grooves 14a will be called as a "grating line".

The first interface part IF1 is provided with a plurality of recesses or protrusions 14b. These recesses or protrusions 14b are two dimensionally arranged with the minimum center-to-center distance in the range of 200 nm to 500 nm. The recesses or protrusions 14b are disposed typically regularly. Each of the recesses or protrusions 14b has a forward tapered shape. A depth or height of each of the recesses or protrusions 14b is usually larger than the depth of the groove 14a, typically in the range of 0.3 µm to 0.5 µm. A ratio of the depth or height to the minimum center-to-center distance of the recesses or protrusions 14b (hereinafter, referred to also as aspect ratio) is, for example, in the range of 0.5 to 1.5.

The third interface part IF3 is a flat surface. The third interface part IF3 may be omitted.

It is difficult to accurately analyze, from a completed display 10, a fine structure on the first interface part IF1.

Further, even if the above-mentioned fine structure could be analyzed from the completed display 10, it is difficult to forge or imitate the display containing the fine structure. In the case of the diffraction grating, according to an optical duplication method that makes use of laser light, the structure may be copied as an interference pattern. However, the fine structure on the first interface part IF1 is impossible to copy.

Optical effects due to a combination of the first optical effect layer 12, the reflective material layer 13 and the second optical effect layer 17 will be described below.

Firstly, an optical effect of a display part DP2 will be described.

FIG. 5 is a diagram schematically showing an optical effect offered by a portion of the display shown in FIGS. 1 and 2 that corresponds to the second interface part. In FIG. 5, 31a indicates an illumination light, 32a indicates a regularly reflected light or 0th-order diffracted light, and 33a indicates the 1st-order diffracted light. In FIG. 5, the first optical effect layer 12 and the reflective material layer 13 are not shown.

When a diffraction grating is illuminated, the diffraction grating emits a diffracted light 33a strong in a specific direction relative to a traveling direction of the illumination light 31a, which is an incident light. When a light travels in a plane perpendicular to the grating lines of the diffraction grating, an angle of emergence of the m-th-order diffracted light can be calculated from the following equation (1) (m=0, ±1, ±2, . . . ).

$$d = m\lambda / (\sin \alpha - \sin \beta) \qquad (1)$$

In the equation (1), d represents a grating constant of the diffraction grating, and $\lambda$ represents a wavelength of incident light and diffracted light. Further, $\alpha$ represents an angle of emergence of a 0th-order diffracted light, that is, a transmission light or regularly reflected light. In other words, an absolute value of $\alpha$ is equal with an incident angle of the illumination light and in a relationship symmetrical with the incident angle relative to a z axis (in the case of reflection-type diffraction grating). As to $\alpha$ and $\beta$, a clockwise direction from the z axis is taken as a positive direction.

The most typical diffracted light is the 1st-order diffracted light 33a. As obvious from the equation (1), an angle of emergence $\beta$ of the 1st-order diffracted light varies in accordance with a wavelength $\lambda$. That is, the diffraction grating has a function as a spectrometer. Accordingly, in the case where the illumination light is white light, when an observation angle is changed in a plane perpendicular to a grating line of the diffraction grating, a color recognized by an observer is also changed.

Further, a color recognized by an observer under a certain observation condition varies in accordance with the grating constant d.

As an example, it is assumed that the diffraction grating emits the 1st-order diffracted light 33a in a direction normal to the diffraction grating. That is, it is assumed that an angle of emergence $\beta$ of the 1st-order diffracted light 33a is 0°. Further, it is assumed that an observer perceives the 1st-order diffracted light 33a. At this time, when an angle of emergence of the 0th-order diffracted light 32a is $\alpha_N$, the equation (1) can be simplified to the following equation (2).

$$d = \lambda / \sin \alpha_N \qquad (2)$$

As obvious from the equation (2), in order to make an observer to recognize a specific color, a wavelength $\lambda$ corresponding to the color, an incident angle $|\alpha_N|$ of the illumination light 31a and the grating constant d may well be set so as to satisfy the relationship shown by the equation (2). For example, white light containing all light components in the range of wavelength of 400 nm to 700 nm is used as an illumination light 31a, and an incident angle $|\alpha_N|$ of the illumination light 31a is set to 45°. Then, a diffraction grating of which spatial frequency (inverse number of grating constant) distributes in the range of 1,000 lines/mm to 1,800 lines/mm is used. In this case, when the diffraction grating is observed from the normal direction, a portion where the spatial frequency is about 1,600 lines/mm is seen blue-colored, and a portion where the spatial frequency is about 1,100 lines/mm is seen red-colored.

The diffraction grating having a smaller spatial frequency is easy to form. Accordingly, in an ordinary display, majority of the diffraction gratings are diffraction gratings having a spatial frequency from 500 lines/mm to 1,600 lines/mm.

Thus, a color recognized by an observer under a certain observation condition can be controlled by the grating constant d (or spatial frequency) of the diffraction grating. And, when the observation angle is varied from the previous observation condition, a color recognized by the observer varies.

In the above description, it is assumed that light travels in a plane perpendicular to the grating lines. When, an orientation of the grating line is changed from this state to rotate with a normal line of a main surface of the display 10 as an axis of rotation, an effective value of the grating constant d for a constant observation direction varies in accordance with an angle of the grating line (hereinafter, also referred to as azimuth angle) relative to a reference state. As the result thereof, a color recognized by an observer varies. Conversely, when a plurality of diffraction gratings different only in the orientation of the grating lines is disposed, these diffraction gratings can display different colors. Further, when the azimuth angle becomes large enough, diffracted light can not be recognized from the constant observation direction the same as the case where there is no diffraction grating. By making use of this, by use of two or more kinds of diffraction gratings largely different in the orientation of the grating line, when observed from directions corresponding to the respective grating lines, images independent from each other can be displayed as well.

Further, when a depth of the grooves 14a that constitute the diffraction grating is made deeper, depending on a wavelength of the illumination light 31a and so on, the diffraction efficiency varies. When an area ratio of the diffraction grating to a pixel is made larger, the intensity of the diffracted light becomes stronger.

Accordingly, in the case where the second interface part IF2 is formed by arranging a plurality of pixels, when spatial frequencies and/or azimuth angles of the grooves 14a are made different between one or more pixels and other pixel(s), the former and the latter can display different colors, and, further, an observable condition can be set. Further, when at least one of the depth of the groove 14a and/or the area ratio of the diffraction grating to the pixel is made different between one or more of the pixels and other pixel(s) that constitute the second interface part IF2, the brightness of the pixels can be differentiated. Accordingly, by making use thereof, the second interface part IF2 can display an image such as a full-color image, a stereo-image or the like.

The term "image" here means what can be observed as a spatial distribution of color and/or brightness. The "image" encompasses photographs, figures, paintings, characters, marks and so on.

A portion of the second optical effect layer 17 that corresponds to the second interface part IF2 emits light different in wavelength depending on an observation angle. However, the intensity of the diffracted light emitted by a portion of the second interface part IF2 that is covered with the reflective material layer 13 is far higher than the intensity of light emitted by the corresponding portion of the second optical effect layer 17. Accordingly, the display part DP2 is usually observed as a region where a diffraction grating is disposed.

Next, an optical effect of the display part DP1 will be described.

FIG. 6 is a diagram schematically showing an optical effect offered by a portion of the display shown in FIGS. 1 and 2 that corresponds to the first interface part. In FIGS. 6, 31b and 31c each indicates an illumination light, 32b and 32c each indicates a regularly reflected light or a 0th-order diffracted light, and 33b indicates a 1st-order diffracted light. In FIG. 6, the first optical effect layer 12 and the reflective material layer 13 are not shown.

When the interface part IF1 and the interface part IF2 are provided, the recesses or protrusions 14b on the first interface part IF1 are arranged at the center-to-center distance smaller than the minimum center-to-center distance of the grooves 14a. Accordingly, even when the recesses and protrusions 14b are regularly arranged and the first interface part IF1 emits the diffracted light 33b, the observer does not simultaneously recognize the diffracted light 33b and the diffracted light 33a from the second interface part IF2 having the same wavelength therewith. In particular, when the difference between the minimum center-to-center distance of the grooves 14a, that is, the grating constant of the diffraction grating, and the center-to-center distance of the recesses or protrusions 14b is large enough, irrespective of the wavelength, the observer can not simultaneously recognize the diffracted light 33a from the second interface part IF2 and the diffracted light 33b from the first interface part IF1. However, as obvious from the equation (1), when a high-order diffracted light ($|m|≥2$) is generated, within an observation angle capable of recognizing a high-order diffracted light 33a from the second interface part IF2, also the diffracted light 33b from the first interface part IF1 can be made recognizable.

Further, each of the recesses or protrusions 14b has a forward tapered shape. Accordingly, when observed from whatever angle, the reflectance of the first interface part IF1 for the regularly reflected light is small.

In addition, when an angle of emergence of the 1st-order diffracted light 33b from the first interface part IF1 is larger than −90°, by properly adjusting an angle that the observation direction and a normal line direction of the display 10 form, the observer can recognize the 1st-order diffracted light 33b from the first interface part IF1. Therefore, in this case, it can be visually confirmed that the display DP1 is different from a portion that is composed only of a layer containing at least one of the cholesteric liquid crystal, pearl pigment and multilayer interference film.

As described above, the minimum center-to-center distance of the recesses or protrusions 14b is in the range of 200 nm to 500 nm. When the minimum center-to-center distance is made smaller, in some cases, it is difficult to make the diffracted light from the interface part IF1 emerge. When the minimum center-to-center distance is made larger, in some cases, the intensity of the diffracted light emitted at a relatively small angle of emergence from the first interface part IF1 becomes relatively large.

The minimum center-to-center distance of the recesses or protrusions 14b may be, for example, in the range of 200 nm to 350 nm. In this case, as obvious from the equation (1), in the first interface part IF1, the diffracted light having a wavelength corresponding to blue light can be readily observed. Accordingly, for example, when the second interface part IF2 emits the diffracted light having a wavelength corresponding to red color, by comparing both, the display 10 is more readily confirmed to be a authentic article.

Alternatively, the minimum center-to-center distance of the recesses or protrusions 14b may be in the range of 300 nm to 500 nm. When implemented like this, a range of angle where the 1st-order diffracted light 33b emitted by the recesses or protrusions 14b can be observed becomes relatively wide. That is, when implemented like this, a authentic article to which the recesses or protrusions 14b are provided and a forged article to which the recesses or protrusions 14b are not provided can be readily differentiated.

As described above, the reflectance of the first interface part IF1 for the regularly reflected light is small. Further, the intensity of the diffracted light emitted by the first interface part IF1 at a relatively small angle of emergence is zero or very small. Accordingly, the regularly reflected light or diffracted light emitted by the first interface part IF1 have a relatively small effect on light emitted by a portion of the second optical effect layer 17 that corresponds to the first interface part IF1. Therefore, at the display part DP1, an optical effect due to the second optical effect layer 17 can be very clearly recognized by the observer.

The first interface part IF1 may include a plurality of regions that are different from each other in at least one of a shape, a depth or height, a center-to-center distance, and a pattern of arrangement of the recesses or protrusions 14b. In this case, each of the portions corresponding to the plurality of regions can exert an optical effect different from each other.

Further, in the case where the first interface part IF1 is configured by arranging a plurality of pixels, when one or more of the pixels and other pixel(s) are differentiated in at least one of a shape, a depth or height, a center-to-center distance, and a pattern of arrangement of the recesses or protrusions 14b, their reflectances or the like can be differentiated. Accordingly, by making use of this, the first interface part IF1 can display a gray-scale image.

Still further, in the display 10, the second interface part IF2 and the first interface part IF1 are in the same plane. Accordingly, for example, when a recess structure and/or a protrusion structure corresponding the grooves 14a and the recesses or protrusions 14b is formed on an original plate, and the recess structure and/or the protrusion structure is transferred onto the first optical effect layer 12, the grooves 14a and the recesses or protrusions 14b can be simultaneously formed. Therefore, when the recess structure and/or the protrusion structure is formed with high precision on an original plate, a problem of the position displacement between the second interface part IF2 and the first interface part IF1 is not generated. Further, features of a fine concavo-protrusion structure and high precision allows to display a high definition image and make easy to differentiate it from an article produced according to other method. Further, a fact that authentic articles can be stably manufactured with very high precision make easier to differentiate these from forged articles and imitation articles.

Next, an optical effect of the display part DP3 will be described.

The third interface part IF3 is, as was described above, a flat surface. Accordingly, a portion of the third interface part IF3 that is covered with the reflective material layer 13 specularly reflects illumination light. The intensity of the reflected light is far stronger than that of light emitted by the corresponding portion of the second optical effect layer 17. As the result thereof, the display part DP3 is usually observed as a mirror surface.

The display 10 shown in FIGS. 1 and 2 offers a very special visual effect depending on an incident angle of illumination light and an observation angle of an observer.

Hereinafter, with a direction normal to the display 10 as a reference direction, an angular range that includes a direction of emergence of a regularly reflected light for a specific illumination light is referred to as a "positive angular range", and an angular range including an incident direction of the specific illumination light is referred to as a "negative angular range". The illumination light is assumed to be white light.

Firstly, a case where the illumination light is incident only at an angle within a negative angular range and the display 10 is observed at an angle within a positive angular range will be considered. In this case, as was described above, the display part DP1 very clearly exhibits the optical effect due to the second optical effect layer 17. That is, the display part DP1 is visually recognized as a region that shows different colors in accordance with an observation angle. Further, in this case, the display part DP2 is usually observed as a region where the diffraction grating is disposed. That is, at the display part DP2, a diffracted light whose wavelength varies in accordance with the observation angle is recognized. Also, in this case, the display part DP3 is usually observed as a mirror surface. That is, at the display part DP3, when observed at an angle capable of observing regularly reflected light, light having the same wavelength as that of the illumination light is recognized. As above, when observing the display 10 at an angle within a positive angular range, the display 10 is observed to include a region that exhibits different colors in accordance with an observation angle, a region provided with a diffraction grating, and a region provided with a mirror surface.

Then, a case where the illumination light is incident only at an angle within the negative angular range and the display 10 is observed at an angle within the negative angular range will be considered. In this case, when an incident angle of the illumination light and an observation angle are wide, that is, when absolute values of the incident angle and observation angle are large, the observer can recognize diffracted light from the display part DP1. Accordingly, for example, when a position of a light source of the illumination light and a position of the observer are fixed and an angle between these and the display 10 is continued to change, a discontinuous variation of the visual effect is generated in the display part DP1. Specifically, when the incident angle and the observation angle are made wider, the diffracted light from the display part DP1 can be observed at a certain angle.

Subsequently, assuming a room interior where fluorescent lamps are disposed at a plurality of places, supposed is a case where two or more light sources of illumination light are present. As an example, supposed is a case where a first light source that makes an illumination light incident at an angle within a negative angular range and a second light source that makes an illumination light incident at an angle within a positive angular range are present. In this case, for example, when positions of the first and second light sources and the position of the observer are fixed and an angle between these and the display 10 is changed, a discontinuous change of the visual effect is generated in the display part DP1. Specifically, when the observation angle is narrow, a continuous change of color due to the second optical effect layer 17 is generated in the display part DP1. When the incident angle and observation angle are made wider, the diffracted light from the display part DP1 becomes observable at certain angles or wider.

In the display 10 shown in FIGS. 1 and 2, the first interface part IF1 and the second interface part IF2 are located adjacent to each other. The reflective material layer 13 covers both of the first interface part IF1 and the second interface part IF2 such that it crosses over the boundary therebetween. Further, the second optical effect layer 17 is disposed so that an orthogonal projection of the second optical effect layer 17 on a main surface of the first optical effect layer 12 containing the interface parts IF1 and IF2 crosses over the boundary between the first interface part IF1 and the second interface part IF2.

The boundary between the first interface part IF1 and the second interface part IF2 can be defined with high precision according to an electron beam lithography method and a nano-imprinting method. Accordingly, when such a configuration is adopted, the boundary between the display part DP1 and the display part DP2 can be defined at high precision. Accordingly, when implemented like this, the display 10 can display a high definition pattern corresponding to the boundary between the first interface part IF1 and the second interface part IF2.

In the display 10 shown in FIGS. 1 and 2, the first interface part IF1 and the third interface part IF3 are located adjacent to each other. The reflective material layer 13 covers both of the first interface part IF1 and the third interface part IF3 so as to cross over a boundary therebetween. Further, the second optical effect layer 17 is disposed so that its orthogonal projection on a main surface of the first optical effect layer 12 including the interface parts IF1 and IF3 crosses over a boundary between the first interface part IF1 and the second interface part IF3.

The boundary between the first interface part IF1 and the third interface part IF3 can be defined with high precision according to an electron beam lithography method and a nano-imprinting method. Accordingly, when such a configuration is adopted, the boundary between the display part DP1 and the display part DP3 can be defined at high precision. Accordingly, by implementing like this, the display 10 can display a high definition pattern corresponding to the boundary between the first interface part IF1 and the third interface part IF3.

As above, the display 10 has a very specific visual effect. It is impossible or very difficult for a person who tries to forge to reproduce the visual effect like this. That is, the display 10 has a very high forgery prevention effect.

When the second optical effect layer 17 contains the cholesteric liquid crystal, the second optical effect layer 17 can emit circularly-polarized light as selective reflected light. Further, the present inventors have found that the diffracted light emitted by the first interface part IF1 has linearly-polarized characteristics. Accordingly, when the second optical effect layer 17 contains the cholesteric liquid crystal, based on the difference in the polarization properties, change of the emitted light can be tracked. That is, in this case, the display 10 is useful also as a forgery prevention medium for covert use.

As a method of discriminating an article whose genuineness is unknown between a authentic article and a non-authentic article, for example, the following methods can be mentioned.

Firstly, as a first operation, the display 10 is illuminated with illumination light at an incident angle whose absolute value is less than 60°. At this time, it is confirmed that the optical effect caused by the second optical effect layer 17 can be observed within an angular range with an absolute value of less than 60°. For example, when the second optical effect layer 17 contains the cholesteric liquid crystal, it is confirmed that the second optical effect layer 17 emits the selective reflected light within the angular range.

Then, as a second operation, the display 10 is illuminated with illumination light at an incident angle whose absolute value is 60° or more and less than 90°. At this time, it is confirmed that the optical effect caused by the first interface part IF1 is observed within an angular range whose absolute value is 60° or more and less than 90° and which has the same polarity as that of the angular range for the incident angle. That is, it is confirmed that the diffracted light from the first interface part IF1 can be observed within this angular range.

When the above-mentioned optical effects are observed in both of the first and second operations, the present article is judged as a authentic article. On the other hand, when the above-mentioned respective optical effects are not observed in one or both of the first and second operations, the present article is judged as a non-authentic article.

When the second optical effect layer 17 contains the cholesteric liquid crystal, the discrimination between a authentic article and a non-authentic article may be conducted as described below. That is, when, in the first operation, a circularly-polarized light is emitted in an angular range within which the absolute value of angle is less than 60°, and, in the second operation, a linearly polarized light is emitted in an angular range within which the absolute value of angle is 60° or more and less than 90° and which has the same polarity as that of the angular range including the incident angle, the article may be judged as a authentic article. The discrimination can be performed by observing the display 10 through a polarization plate such as a circularly polarizing plate or a linearly polarizing plate.

FIGS. 7 to 10 are plan views schematically showing examples of arrangement patterns of recesses or protrusions adoptable in the first interface part.

Figure 7:
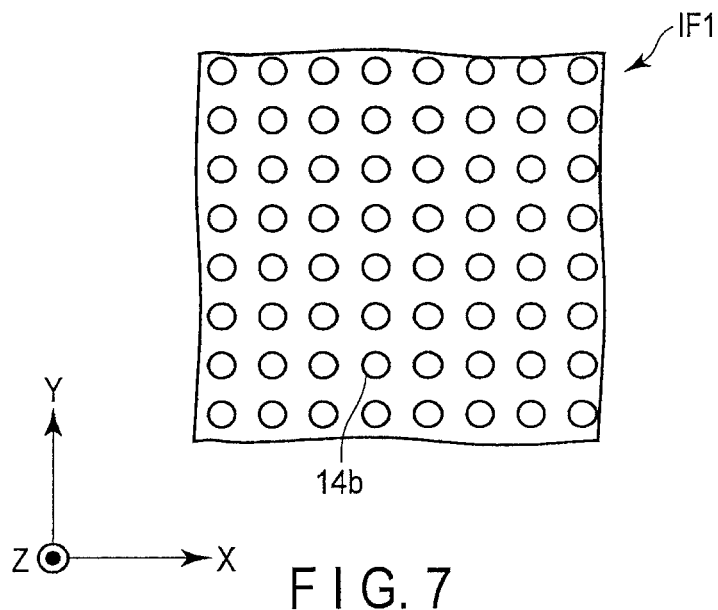
FIG. 7 is plan views schematically showing an example of arrangement patterns of recesses or protrusions adoptable in the first interface part.

In FIG. 7, the arrangement of the recesses or protrusions 14b forms a square lattice. The structure can be relatively easily manufactured by use of a micro-fabrication machine such as an electron beam writer or a stepper, and the center-to-center distance of the recesses or protrusions 14b can be relatively easily controlled at high precision.

In FIG. 7, the center-to-center distances of the recesses or protrusions 14b are set equal in X direction and Y direction. However, the center-to-center distances of the recesses or protrusions 14b may be set differently in X direction and Y direction. That is, the arrangement of the recesses or protrusions 14b may form a rectangular lattice.

When the center-to-center distances of the recesses or protrusions 14b are set relatively long both in X direction and Y direction, the first interface part IF1 can emit diffracted light in either of the case where the display 10 is illuminated in a direction perpendicular to the Y direction and the case where the display 10 is illuminated in a direction perpendicular to the X direction, and the wavelengths of the diffracted lights can be differentiated between the former case and the latter case. When the center-to-center distance of the recesses or protrusions 14b is set relatively longer in one direction of the X direction and Y direction and the other is set relatively shorter, the first interface part IF1 emits diffracted light in the case where the display 10 is illuminated in a direction perpendicular to one of the X direction and Y direction, and the diffracted light can be inhibited from emerging from the first interface part IF1 in the case where the display 10 is illuminated in a direction perpendicular to the other direction of the X direction and Y direction.

Figure 8:
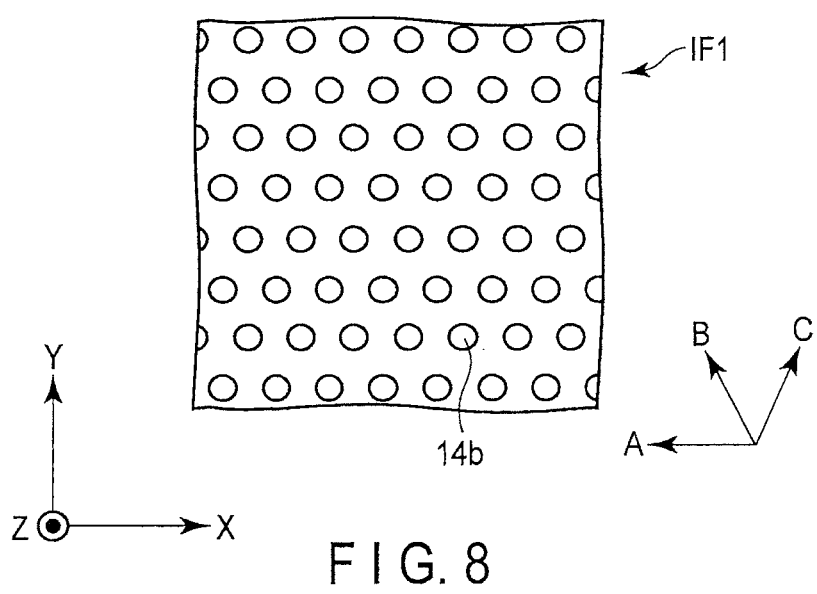
FIG. 8 is plan views schematically showing an example of arrangement patterns of recesses or protrusions adoptable in the first interface part.

In FIG. 8, the arrangement of the recesses or protrusions 14b forms a triangular lattice. In the case where the structure is adopted and the center-to-center distance of the recesses or protrusions 14b is properly set, the diffracted light can be inhibited from emerging from the first interface part IF1, for example, when the display 10 is illuminated in an A direction, and the first interface part IF1 can emit the diffracted light when the display 10 is illuminated in a B direction and a C direction. That is, more complicated visual effects can be obtained.

In FIG. 9, the recesses or protrusions 14b are randomly arranged. When the recesses or protrusions 14b are randomly arranged, emission of the diffracted light by the first interface part IF1 becomes less prone to occur. The structure can be formed by recording an intensity distribution of speckles by making use of, for example, interference of light.

In FIG. 10, in addition to that the recesses or protrusions 14b are randomly arranged, their sizes are uneven. In the case where the structure is adopted, as compared with the case where the structure of FIG. 9 is adopted, emission of the diffracted light by the first interface part IF1 becomes further less prone to occur.

As illustrated in FIGS. 7 to 10, the arrangement pattern of the recesses or protrusions 14b can be variously modified. Each of the respective arrangement patterns offers an inherent visual effect. Accordingly, when the first interface part IF1 is formed of a plurality of pixels different in the arrangement pattern of the recesses or protrusions 14b, more complicated visual effects can be obtained.

Figure 13:
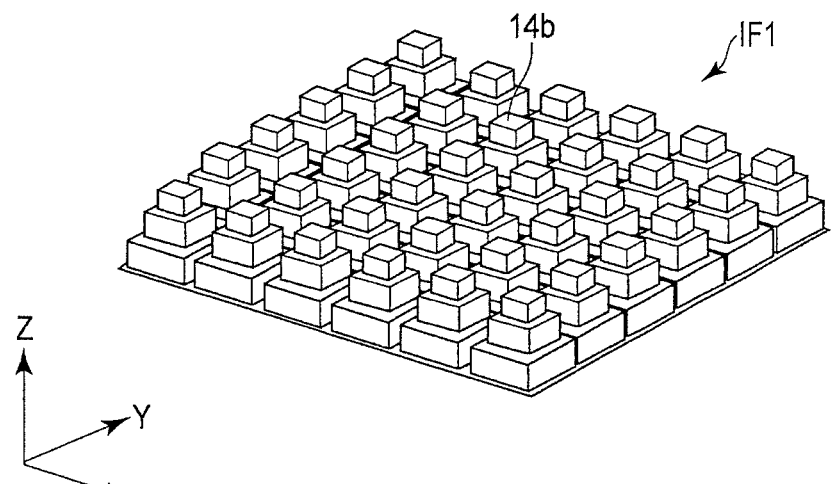
FIG. 13 is an enlarged perspective view showing another example of the structure adoptable in the first interface part IF1 of the display shown in FIGS. 1 and 2.

FIGS. 11 to 13 are enlarged perspective views showing other examples of the structure adoptable in the first interface part IF1 of the display shown in FIGS. 1 and 2.

Structures shown in FIGS. 11 to 13 are modification examples of the structure shown in FIG. 4. Each of the recesses or protrusions 14b shown in FIGS. 11 to 13 has a forward tapered shape.

In the structure shown in FIG. 4, each of the recesses or protrusions 14b has a conical shape. When each of the recesses or protrusions 14b is formed in a shape of cone, each of the recesses or protrusions 14b may have a pointed tip or a truncated conical shape. When employing a conical shape in the recesses or protrusions 14b, the recesses or protrusions 14b may have a pointed tip or be truncated. In the case where each of the recesses or protrusions 14b has a conical shape with a pointed tip, the reflectance of the first interface part IF1 for the regularly reflected light can be made smaller as compared with the case where each of the recesses or protrusions 14b has a truncated conical shape because in the former case, the recesses or protrusions 14 have no surface that is parallel with the first interface portion.

In the structure shown in FIG. 11, each of the recesses or protrusions 14b has a square pyramidal shape. The recesses or protrusions 14b may have a pyramidal shape other than the square pyramid such as a triangular pyramid or the like. In this case, the intensity of the diffracted light generated under a specific condition can be enhanced, thereby the observation is made easier. Further, when the recesses or protrusions 14b are formed in pyramid, each of the recesses or protrusions 14b may have a pointed tip or a truncated pyramidal shape. In the case where each of the recesses or protrusions 14b has a pointed pyramidal shape, the reflectance of the first interface part IF1 for the regularly reflected light can be made smaller as compared with the case where each of them has a truncated shape because in the former case, the recesses or protrusions 14b do not have a plane in parallel with the first interface part IF1.

In the structure shown in FIG. 12, each of the recesses or protrusions 14b has a half-spindle shape. That is, the recess or protrusion 14b has a conical shape with a rounded tip. In the case where the structure shown in FIG. 12 is adopted, formation of a protrusion structure and/or a recess structure on an original plate and transfer of the protrusion structure and/or the recess structure from the original plate to the first optical effect layer 12 are easy as compared with the case where the structure shown in FIG. 4 or 11 is adopted.

In the structure shown in FIG. 13, each of the recesses or protrusions 14b has a structure in which a plurality of quadrangular prisms different in bottom area is stacked in order from a quadrangular prism having larger bottom area. In place of the quadrangular prisms, prisms other than the quadrangular prisms such as circular prisms or triangular prisms may be stacked.

In the case where the structure shown in FIG. 13 is adopted, the reflectance of the first interface part IF1 for the specularly reflected light cannot be made small as compared with the case where the structure shown in FIG. 4, 11 or 12 is adopted. However, in the case where the structure shown in FIG. 13 is adopted, similarly to the case where the structure shown in FIG. 12 is adopted, formation of a protrusion structure and/or a recess structure on an original plate and transfer of the protrusion structure and/or the recess structure from the original plate to the first optical effect layer 12 are easy as compared with the case where the structure shown in FIG. 4 or 11 is adopted.

As above, the shape of the recess or protrusion 14b affects the reflectance of the first interface part IF1. Accordingly, when the first interface part IF1 is formed of a plurality of pixels different in the shapes of the recesses or protrusions 14b, the first interface part IF1 can display a gray-scale image.

The minimum center-to-center distance of the recesses or protrusions 14b is in the range of 200 nm to 500 nm as described above. When the minimum center-to-center distance is adjusted, the visual effect of the display 10 can be adjusted. For example, when the minimum center-to-center distance of the recesses or protrusions 14b is set at 400 nm or less, as obvious from the equation (2), for all wavelengths in the visible range, i.e., a range of 400 nm to 700 nm, irrespective of the incident angle of the illumination light, the first interface part IF1 is inhibited from emitting the diffracted light in the normal direction. Accordingly, when implemented like this, the optical effect in the display part DP1 caused by the second optical effect layer 17 can be more clearly recognized. Further, when the first interface part IF1 is formed of a plurality of pixels different in the center-to-center distance of the recesses or protrusions 14b, the first interface part IF1 can display a gray-scale image.

When the depth or height of the recesses or protrusions 14b on the first interface part IF1 is made larger, for example, one half or larger of the minimum center-to-center distance thereof, the intensity of the reflected light emitted by the first interface part IF1 can be made smaller. Accordingly, by implementing like this, the optical effect in the display part DP1 caused by the second optical effect layer 17 can be more clearly recognized. Further, when the first interface part IF1 is formed of a plurality of pixels different in the depth or height of the recesses or protrusions 14b, the first interface part IF1 can display a gray-scale image.

When a ratio of a dimension of the recess or protrusion 14b in a direction parallel with the first interface part IF1 to the center-to-center distance of the recesses or protrusions 14b in this direction is made closer to 1:1, the intensity of the reflected light emitted by the first interface part IF1 becomes smaller. When a dimension of the recess or protrusion 14b in a direction parallel with the first interface part IF1 are made equal to the center-to-center distance of the recesses or protrusions 14b in this direction, the intensity of the reflected light emitted by the first interface part IF1 becomes the smallest. Accordingly, when implemented like this, the optical effect due to the second optical effect layer 17 in the display part DP1 can be more clearly recognized. Further, when the first interface part IF1 is formed of a plurality of pixels different in the above ratio, the first interface part IF1 can display a gray-scale image.

Various modifications can be made on the display 10 shown in FIGS. 1 and 2.

Figure 14:
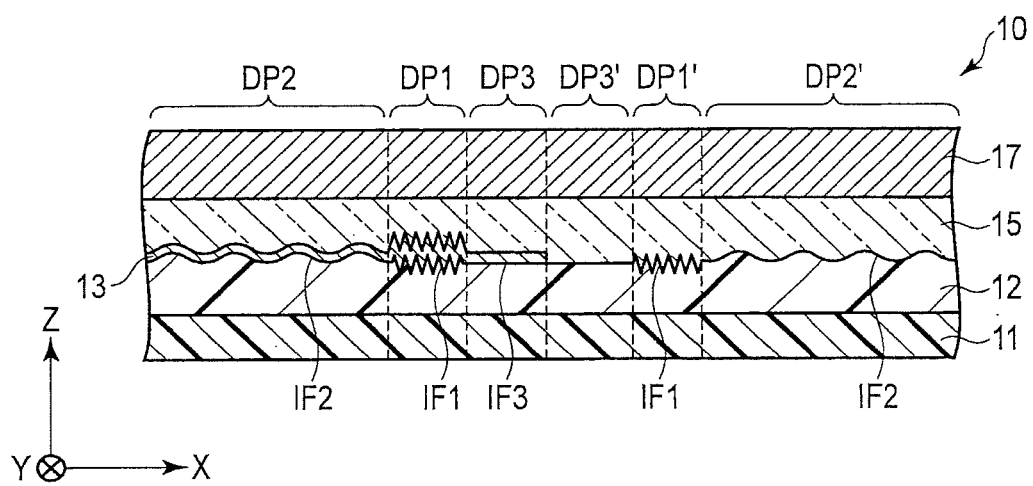
FIG. 14 is a sectional view schematically showing a display according to a modification.

FIG. 14 is a sectional view schematically showing a display according to a modification. The display 10 shown in FIG. 14 has a structure similar to that of the display shown in FIGS. 1 and 2 except that the reflective material layer 13 covers only a part of the first interface part IF1, a part of the second interface part IF2 and a part of the third interface part IF3.

Hereinafter, a portion of the first interface part IF1 that is not covered with the reflective material layer 13 is referred to as a fourth region. Further, a portion of the second interface part IF2 that is not covered with the reflective material layer 13 is referred to as a fifth region. And, a portion of the third interface part IF3 that is not covered with the reflective material layer 13 is referred to as a sixth region.

In addition, hereinafter, a portion of the display 10 that corresponds to the fourth region is referred to as a display part DP1'. Further, a portion of the display 10 that corresponds to the fifth region is referred to as a display part DP2'. And, a portion of the display 10 that corresponds to the sixth region is referred to as a display part DP3'.

In the display 10 shown in FIG. 14, the reflective material layer 13 covers only a part of the first interface part IF1. And, the second optical effect layer 17 has a portion that faces the first optical effect layer 12 at a position of a portion of the first interface part IF1 that is not covered with the reflective material layer 13.

In the display part DP1', the first interface part IF1 is not covered with the reflective material layer 13. Accordingly, the display part DP1' offers a visual effect almost the same as that offered in the case where the first interface part IF1 does not exist. That is, the intensity of the diffracted light emitted by the display part DP1' is zero or very small. Further, in the display part DP1', as compared with the display part DP1, the visual effect caused by the second optical effect layer 17 is slightly obscure. As the result thereof, when the above-mentioned structure is adopted, the brightness and color can be differentiated between the display part DP1 and the display part DP1'.

In the display 10 shown in FIG. 14, the reflective material layer 13 covers only a part of the second interface part IF2. And, the second optical effect layer 17 has a portion that faces the first optical effect layer 12 at both positions of a portion of the second interface part IF2 that is covered with the reflective material layer 13 and a portion of the second interface part IF2 that is not covered with the reflective material layer 13.

In the display part DP2', the second interface part IF2 is not covered with the reflective material layer 13. Accordingly, the display part DP2' offers a visual effect almost the same as that offered in the case where the first interface part IF2 does not exist. That is, the intensity of the diffracted light emitted by a portion of the second interface part IF2 that is not covered with the reflective material layer 13 is zero or very small. Therefore, the intensity of the diffracted light is far lower than that of a light emitted by the corresponding portion of the second optical effect layer 17. Accordingly, the display part DP2' is usually observed as a region that exhibits the visual effect caused by the second optical effect layer 17. As the result thereof, when the above-mentioned structure is adopted, the brightness and color can be differentiated between the display part DP2 and the display part DP2'.

In the display 10 shown in FIG. 14, the reflective material layer 13 covers only a part of the third interface part IF3. And, the second optical effect layer 17 has a portion that faces the first optical effect layer 12 at both positions of a portion of the third interface part IF3 that is covered with the reflective material layer 13 and a portion of the third interface part IF3 that is not covered with the reflective material layer 13.

In the display part DP3', the third interface part IF3 is not covered with the reflective material layer 13. Accordingly, the intensity of the diffracted light emitted by a portion of the third interface part IF3 that is not covered with the reflective material layer 13 is zero or very small. That is, the intensity of the reflected light is far lower than that of a light emitted by the corresponding portion of the second optical effect layer 17. Accordingly, the display part DP3' is usually observed as a region that exhibits the visual effect caused by the second optical effect layer 17. As the result thereof, when the above-mentioned structure is adopted, the brightness and color can be differentiated between the display part DP3 and the display part DP3'.

As above, when at least one of the interface parts IF1 to IF3 includes a portion that is covered with the reflective material layer 13 and a portion that is not covered with the reflective material layer 13, more complicated optical effects can be achieved. That is, when implemented like this, still higher forgery inhibition effects can be achieved.

In the display 10 shown in FIG. 14, the reflective material layer 13 covers only a part of a main surface of the first optical effect layer 12. Such a reflective material layer 13 can be formed as described below.

According to a first method, on one main surface of the first optical effect layer 12, a water-based ink is printed in a negative pattern. A layer of a reflective material is formed over an entire surface thereof by use of an evaporation method or a sputtering method. Then, the water-based ink is washed away with water. Thus, a portion of the layer of the reflective material that is located above the pattern of the water-based ink is removed. The reflective material layer 13 that covers only a part of one main surface of the first optical effect layer 12 is thus obtained.

According to a second method, firstly, on an entirety of one main surface of the first optical effect layer 12, a layer of a reflective material is formed. Thereafter, a masking agent is printed on the layer in a positive pattern. Then, by use of a corrosive agent, a portion of the layer of the reflective material that is not covered with the masking agent is removed. Subsequently, as required, the masking agent is removed. The reflective material layer 13 that covers only a part of one main surface of the first optical effect layer 12 is thus obtained.

According to a third method, firstly, on an entirety of one main surface of the first optical effect layer 12, a layer of the reflective material is formed. Thereafter, a portion of the layer of the reflective material that is to be removed is illuminated with high-intensity laser beam. Thereby, a part of the layer of the reflective material is selectively destroyed. The reflective material layer 13 that covers only a part of one main surface of the first optical effect layer 12 is thus obtained.

Figure 15:
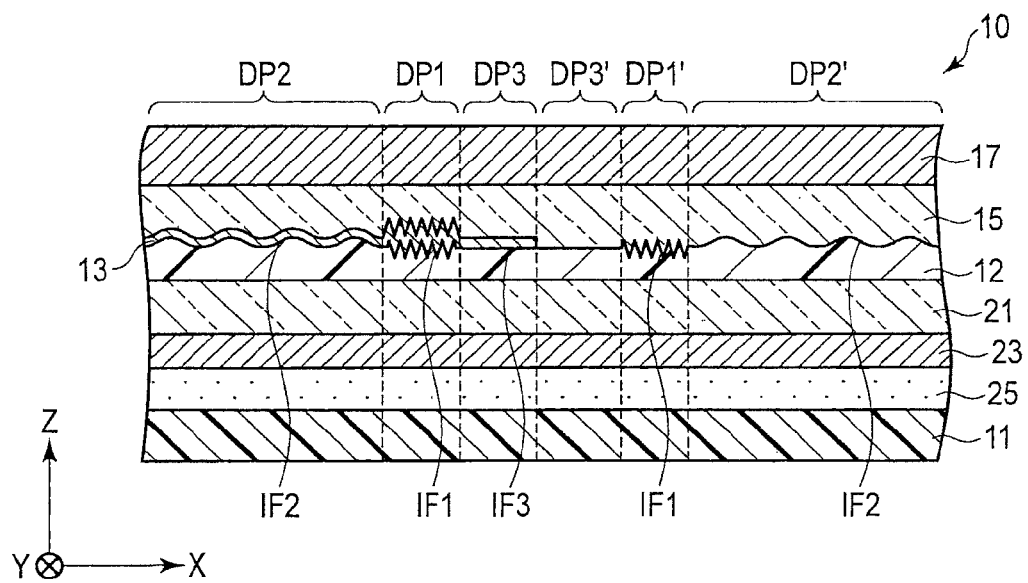
FIG. 15 is a sectional view schematically showing a display according to another modification.

FIG. 15 is a sectional view schematically showing a display according to another modification. A display 10 shown in FIG. 15 has a structure similar to the display shown in FIG. 14, except that a first optical effect layer 12 has light-transmitting properties and is further provided with a light-transmitting substrate 21, a light-absorbing layer 23, and an adhesive layer 25.

As the light-transmitting substrate 21, for examples, what has the light-transmitting properties of the above-described substrates 11 is used. The light-transmitting substrate 21 is typically transparent. The light-transmitting substrate 21 may be omitted.

The light-absorbing layer 23 faces the second optical effect layer 17 with the first optical effect layer 12 interposed therebetween. As the light-absorbing layer 23, a layer of, for example, a black ink is used. The term "black" here means that, for example, when the display 10 is illuminated with light in the normal direction and the intensity of the regularly reflected light is measured, the reflectance of all light components in the range of 400 nm to 700 nm of wavelength is 10% or less.

Alternatively, as the light-absorbing layer 23, a magnetic layer may be adopted. That is, the light-absorbing layer 23 may contain a magnetic substance. The magnetic substance is contained in the light-absorbing layer 23 typically in a form of powder. Examples of the powder of magnetic substances include iron oxide powder, chromium oxide powder, cobalt powder, ferrite powder and mixtures thereof. Further, in this case, the light-absorbing layer 23 may further contain a black pigment such as carbon black or the like. As the powder of the magnetic substance that the light-absorbing layer 23 can contain, iron oxide powder is preferable and magnetite powder is particularly preferable. Further, when the light-absorbing layer 23 contains the powder of the magnetic substance, the light-absorbing layer 23 typically further contains a transparent binder.

When the magnetic layer is adopted as the light-absorbing layer 23, in addition to the authenticity check based on the optical properties of the display 10, also the authenticity check based on the magnetic properties can be conducted. That is, when implemented like this, the forgery prevention effect of the display 10 can be further improved.

In FIG. 15, a case where the light-absorbing layer 23 faces the second optical effect layer 17 with the first optical effect layer 12 interposed therebetween is depicted. However, a position of the light-absorbing layer 23 is not restricted thereto. For example, the light-absorbing layer 23 may be interposed between the first optical effect layer 12 and the second optical effect layer 17. When the light-absorbing layer 23 is interposed between the first optical effect layer 12 and the second optical effect layer 17, the first optical effect layer 12 may not have light-transmitting properties.

Although FIG. 15 shows the case where the light-absorbing layer 23 faces an entirety of the second optical effect layer 17 with the first optical effect layer 12 interposed therebetween, a configuration of the light-absorbing layer 23 is not restricted thereto. That is, the light-absorbing layer 23 may face the second optical effect layer 17 at a position of a portion of the first interface part IF1 that is not covered with the reflective material layer 13 with the first optical effect layer 12 interposed therebetween. Alternatively, the light-absorbing layer 23 may be interposed between the first optical effect layer 12 and the second optical effect layer 17 at a position of a portion of the first interface part IF1 that is not covered with the reflective material layer 13.

An adhesive layer 25 is interposed between the light-absorbing layer 23 and the substrate 11, and bonding them together. As the material of the adhesive layer 25, known materials can be used. The adhesive layer 25 may be omitted.

The display part DP1' of the display 10 shown in FIG. 15 includes the light-absorbing layer 23. The light-absorbing layer 23 absorbs light transmitted through the second optical effect layer 17. Accordingly, in this case, in the display part DP1', the visual effect caused by the second optical effect layer 17 can be clearly recognized.

The display parts DP2' and DP3' of the display 10 shown in FIG. 15 includes the light-absorbing layer 23. The light-absorbing layer 23 absorbs light transmitted through the second optical effect layer 17. Accordingly, in the display parts DP2' and DP3', the visual effect caused by the second optical effect layer 17 can be clearly recognized.

Accordingly, when the incident angle of the illumination light and the observation angle is narrow, the display part DP1, the display part DP1', the display part DP2' and the display part DP3' are observed as regions that exhibit almost the same optical effect. However, when the incident angle of the illumination light and the observation angle are wide, as described for the display 10 shown in FIG. 14, the diffracted light having relatively high intensity is observed at the display part DP1. On the other hand, in this case, the display parts DP1' to DP3' do not emit such diffracted light. Accordingly, in this case, by combining the display part DP1 and the display parts DP1' to DP3', a latent image can be formed.

The display 10 described above may be used as, for example, an adhesive label such as a sealing label or the like, a transfer foil such as a stripe transfer foil, a spot transfer foil or the like, or a part of thread. Alternatively, the display 10 may be used as a part of tear tape.

Figure 16:
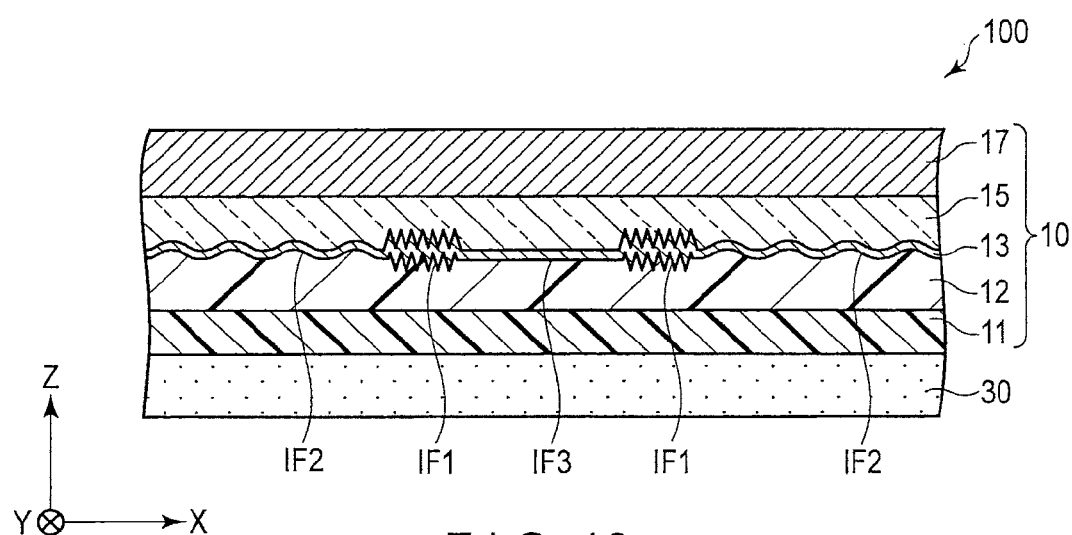
FIG. 16 is a sectional view schematically showing an adhesive label according to an embodiment of the present invention.

FIG. 16 is a sectional view schematically showing an adhesive label according to an embodiment of the present invention. A adhesive label 100 shown in FIG. 16 includes the display 10 shown in FIGS. 1 and 2 and a sticky layer 30 provided on the display 10.

The sticky layer 30 is disposed on one of main surfaces of the substrate 11 that is on a side opposite to the second optical effect layer 17. The sticky layer 30 faces the second optical effect layer 17 with the first optical effect layer 12 and the reflective material layer 13 interposed therebetween. As a material of the sticky layer 30, for example, a pressure-sensitive adhesive is used. The sticky layer 30 is formed by applying a mixture of the adhesive and a solvent by a method such as gravure coating, roll coating, screen coating, blade coating or the like. A thickness of the sticky layer 30 is in the range of, for example, 1 μm to 10 μm.

The adhesive label 100 is adhered to, for example, an article of which authenticity should be confirmed, or, other article such as a substrate of a tag to be attached to such an article. Thereby, the forgery prevention effect can be imparted to the article.

A brittle layer may further disposed between the display 10 and the sticky layer 30 so as impart an upholstery prevention effect to the adhesive label 100. In this case, higher forgery prevention effect can be achieved.

FIG. 17 is a sectional view schematically showing a transfer foil according to an embodiment of the invention. A transfer foil 200 shown in FIG. 17 includes the display 10 shown in FIGS. 1 and 2, and a support layer 45 releasably supporting the display 10. FIG. 17 shows, as an example, a case where a release layer 43 is disposed between the second optical effect layer 17 and the support layer 45 and an adhesive layer 41 is disposed on one of the main surfaces of the substrate 11 that is on a side opposite to the second optical effect layer 17.

The support layer 45 is a film or sheet of, for example, a resin. As the materials of the support layer 45, for example, polyethylene terephthalate resin, polyethylene naphthalate resin, polyimide resin, polyethylene resin, polypropylene resin or vinyl chloride resin is used.

The release layer 43 plays a role in making the release of the support layer 45 easy when the transfer foil 200 is transferred on a transfer-receiver. As the material of the release layer 43, for example, resins mentioned above as the materials for the relief structure-forming layer 110 are used. The release layer 43 may further contain an additive such as paraffin wax, carnauba wax, polyethylene wax, silicone or the like. A thickness of the release layer 43 is set in the range of, for example, 0.5 μm to 5 μm.

Examples of the materials of the adhesive layer 41 include a reactive curing adhesive, a solvent evaporation-type adhesive, a hot-melt adhesive, an EB-curable adhesive, a heat-sensitive adhesive and so on.

Examples of the reactive curing adhesives include polyurethane resins such as polyester urethane, polyether urethane, acryl urethane and so on, or epoxy resins.

Examples of the solvent evaporation-type adhesives include aqueous emulsion adhesives containing vinyl acetate resin, acrylic acid ester copolymer resin, ethylene-vinyl acetate copolymer resin, ionomer resin, urethane resin or the like, and latex adhesives containing natural rubber, styrene-butadiene copolymer resin, acrylonitrile-butadiene copolymer resin or the like.

Examples of the hot-melt adhesives include adhesives that contain ethylene-vinyl acetate copolymer resin, ethylene-ethyl acrylate copolymer resin, polyester resin, polycarbonate resin, polyvinyl ether resin, polyurethane resin or the like as a base resin.

As the EB-curable adhesive, for example, adhesives containing an oligomer having one or a plurality of vinyl functional groups such as acryloyl group, allyl group, vinyl group and so on as a main component are used. For example, as the EB-curable adhesive, a mixture of polyester acrylate, polyester methacrylate, epoxy acrylate, epoxy methacrylate, urethane acrylate, urethane methacrylate, polyether acrylate or polyether methacrylate and a tackifier can be used. Examples of the tackifiers include acrylates containing phosphorus or derivatives thereof, or, acrylates containing carboxyl group or derivatives thereof.

As the heat-sensitive adhesives, for example, polyester resin, acryl resin, vinyl chloride resin, polyamide resin, polyvinyl acetate resin, rubber-based resin, ethylene-vinyl acetate copolymer resin or vinyl chloride-vinyl acetate copolymer resin is used.

The adhesive layer 41 can be obtained, for example, by coating the substrate 11 with the above-mentioned resin by use of a coater such as a gravure coater, a micro-gravure coater, a roll coater or the like.

The transfer foil 200 can be transferred onto a transfer-receiver by, for example, a roller transfer machine or a hot stamper. At this time, delamination occurs at the protective release layer 43 and the display 10 is attached via the adhesive layer 41 to the transfer-receiver.

As described above, the display 10 offers an excellent forgery prevention effect. Accordingly, when the display 10 is supported by an article, also the labeled article, which is an authentic article, is difficult to forge. Further, since the display 10 offers the above-described visual effect, whether an article whose authenticity is unknown can be readily discriminated between a authentic article and a non-authentic article.

Figure 19:
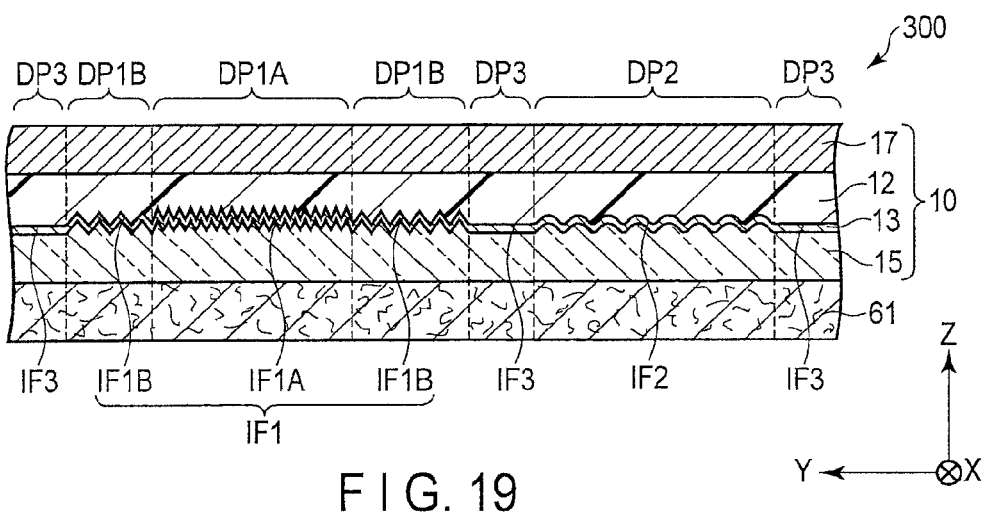
FIG. 19 is a sectional view taken along a XIX-XIX line of the labeled article shown in FIG. 18.

FIG. 18 is a plan view schematically showing an example of a labeled article. FIG. 19 is a sectional view taken along a XIX-XIX line of the labeled article shown in FIG. 18. FIGS. 18 and 19 show a printed matter 300 as an example of a labeled article. The printed matter 300 is a gift certificate and contains a printed matter body 60.

The printed matter body 60 includes a substrate 61. The substrate 61 is a paper in which at least a portion corresponding to the display 10 has the light-transmitting properties. On the substrate 61, a printed layer 61 is formed. On a surface of the substrate 61 on which the printed layer 61 is formed, the display 10 is fixed. The display 10 is fixed on the substrate 61 by bonding them together via, for example, a sticky layer or an adhesive layer.

Since the printed matter 300 contains the display 10, it is difficult to forge the printed matter 300. Further, since the printed matter 300 contains the display 10, it is easy to discriminate an article whose authenticity is unknown between an authentic article or a non-authentic article.

The display 10 contained in the printed matter 300 shown in FIGS. 18 and 19 has the same configuration as that of the display 10 shown in FIGS. 1 and 2 except the following points. Firstly, in the display 10 that the printed matter 300 shown in FIGS. 18 and 19 includes, the substrate 11 is omitted. Further, in the display 10, the second optical effect layer 17 faces the reflective material layer 13 with the first optical effect layer 12 interposed therebetween. Then, in the display 10, the light-transmitting layer 15 is disposed between the reflective material layer 13 and the substrate 61. In addition, in the display 10, configurations of an interface part disposed on one main surface of the first optical effect layer 12 and the reflective material layer 13 covering these are different from those of the displays 10 shown in FIGS. 1 and 2.

The first optical effect layer 12 contained in the printed matter 300 shown in FIGS. 18 and 19 contains, as a first interface part IF1, a first sub-region IF1A and a second sub-region IF1B. FIGS. 18 and 19 depict, as an example, a case where the first sub-region IF1A and the second sub-region IF1B are adjacently located. Hereinafter, a portion of the display 10 that corresponds to the first sub-region IF1A is referred to as a display part DP1A. Further, a portion of the display 10 that corresponds to the first sub-region IF1B is referred to as a display part DP1B.

In the first sub-region IF1A and the second sub-region IF1B, the minimum center-to-center distances of the recesses or protrusions 14b are different from each other. Here, as an example, it is assumed that the minimum center-to-center distance of the recesses or protrusions 14b disposed in the first sub-region IF1A is 300 nm, and the minimum center-to-center distance of the recesses or protrusions 14b disposed in the second sub-region IF1B is 400 nm.

As described above, the first interface part IF1 has a small reflectance. The difference between the reflectances of the first sub-region IF1A and the second sub-region IF1B is relatively small. Accordingly, when an absolute value of the incident angle of the illumination light is relatively small, for example, when the absolute value of the incident angle is less than 60°, in both of the first sub-region IF1A and the second sub-region IF1B, the optical effect due to the second optical effect layer 17 can be very clearly observed. Accordingly, in this case, the display part DP1A and the display part DP1B can not be differentiated from each other, or, are very difficult to differentiate from each other.

On the other hand, when the absolute value of the incident angle of the illumination light is relatively large, for example, the absolute value of the incident angle is 60° or more and less than 90°, each of the first sub-region IF1A and the second sub-region IF1B emits a diffracted light having an wavelength different from each other. For example, when the absolute value of the incident angle is in the range of from 60° to 70° and the absolute value of the observation angle is in the range of from 60° to 70°, the display part DP1A is observed as a region of green color, and the display part DP1B is observed as a region of red color. That is, when the absolute value of the incident light of the illumination light is relatively large, the display part DP1A and the display part DP1B can be differentiated from each other.

That is, when the configuration like this is adopted, a combination of the display part DP1A and the display part DP1B can form a latent image. Accordingly, by implementing like this, the forgery prevention effect of the display 10 and the printed matter 300 can be further enhanced.

In FIGS. 18 and 19, a voucher is exemplified as the printed matter 300 including the display 10. However, the printed matter including the display 10 is not restricted thereto. For example, the printed matter including the display 10 may be other securities such as stock certificates and so on.

Alternatively, the printed matter including the display 10 may be a card such as an ID (identification) card, a magnetic card, a wireless card, an IC (integrated circuit) card or the like. Alternatively, the printed matter including the display 10 may be a tag to be attached to an article whose authenticity should be confirmed. Alternatively, the printed matter including the display 10 may be a package housing an article whose authenticity should be confirmed or a part thereof. In this case, as a material of the substrate 61, for example, plastic having light-transmitting properties is used.

In the printed matter 300 shown in FIGS. 18 and 19, the display 10 is stuck to the substrate 61. However, the display 10 may be supported by the substrate 61 according to other method.

For example, when a paper is used as the substrate 61, the display 10 may be buried in the paper. In this case, for example, the display 10 may be paper made inside of the paper.

When the configuration like this is adopted, the display 10 is formed, typically, into a thread form. On one main surface of the display 10 processed into a thread form, typically, a hot melt adhesive is applied.

The display 10 is buried inside of the paper, for example, as follows.

Firstly, a paper stock containing cellulose fibers and a dispersant is prepared. Then, using a twin cylinder paper machine, the paper stock is made into two wet fiber layers. Then, the two fiber layers are overlaid on top of another, and at this time, the display 10 is sent between the fiber layers. Thereafter, a laminate including the two fiber layers and the display 10 interposed therebetween is dried. Then, as required, a cutting operation is conducted. In a manner like this, a paper having the display 10 buried therein is obtained.

Alternatively, a process where the display 10 is buried inside of the paper may be conducted also as follows.

For example, the display 10 may be buried using a Foudrinier paper machine. Specifically, firstly, into a flow of the paper stock of the cellulose fibers and a dispersant, the display 10 dispersed in a dispersion medium is introduced via a nozzle. Thus, the display 10 is buried in a paper web formed on a paper-making net. Thereafter, this is dried. Then, as required, this is cut. Thus, a paper having the display 10 buried therein is obtained.

When a paper is used as the substrate 61, a part of the paper that corresponds to the display 10 may be opened entirely or partially.

Figure 20:
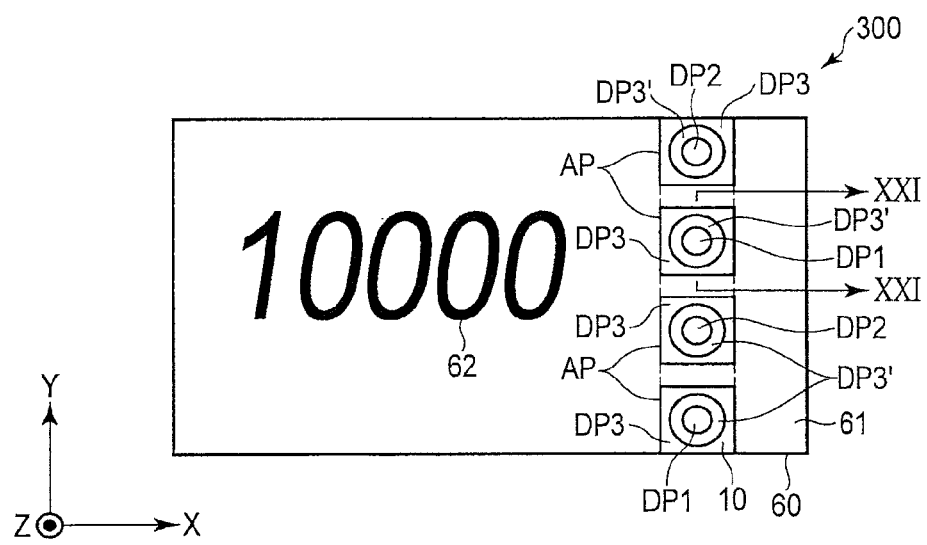
FIG. 20 is a plan view schematically showing another example of a labeled article.
Figure 21:
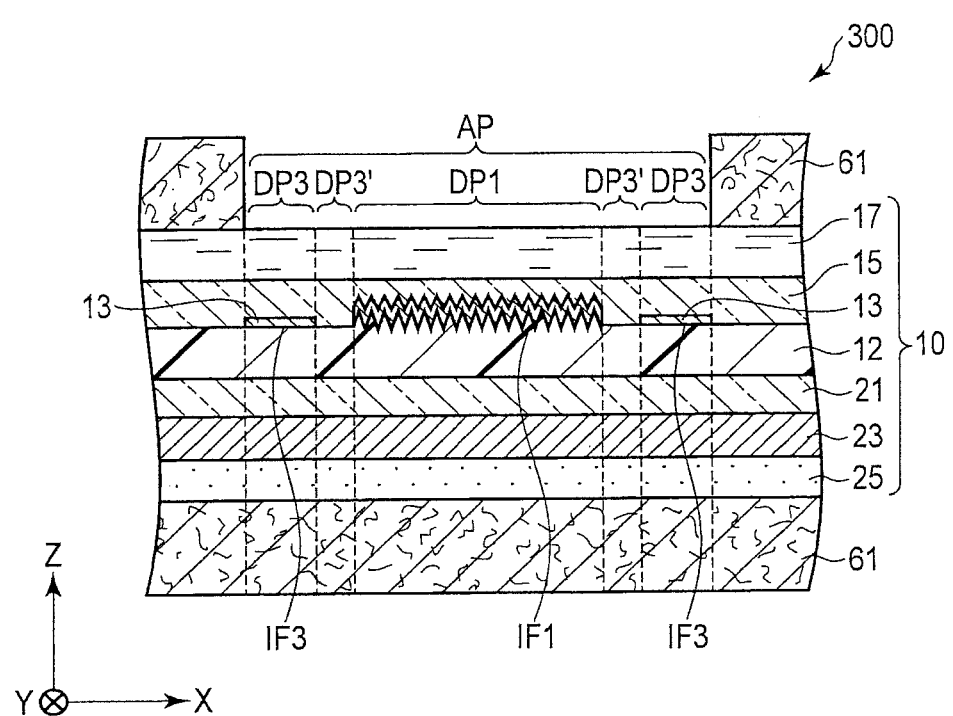
FIG. 21 is a sectional view taken along a XXI-XXI line of the labeled article shown in FIG. 20.

FIG. 20 is a plan view schematically showing another example of a labeled article. FIG. 21 is a sectional view taken along a XXI-XXI line of the labeled article shown in FIG. 20.

The display 10 that the printed matter 300 shown in FIGS. 20 and 21 contains has the configuration as that of the display shown in FIG. 15 except that the substrate 11 is omitted and configurations of an interface part and the reflective material layer 13 disposed on one main surface of the first optical effect layer 12 are different.

A labeled article shown in FIGS. 20 and 21 is a printed matter 300, and the substrate 61 thereof is a paper. Inside of the paper, the display 10 is buried. In addition, a part of the paper that corresponds to the display 10, apertures AP are disposed. That is, in each of the apertures AP, the display 10 is partially exposed to the outside. When the configuration like this is adopted, the display 10 is difficult to detach from the substrate 61. In addition, at a position where the apertures AP is disposed, an influence of the light scattering property of the paper on the optical characteristics of the display 10 can be suppressed to the minimum level.

The printed matter 300 shown in FIGS. 20 and 21 includes a display part DP1, a display part DP2, a display part DP3, and a display part DP3'.

As described above, the reflectance of the first interface part IF1 is small. Further, the display part DP3' does not include the reflective material layer 13 and includes the light-absorbing layer 23. Accordingly, when the absolute value of the incident angle of the illumination light is relatively small, for example, the absolute value of the incident angle is less than 60°, in both of the display part DP1 and the display part DP3', the optical effect caused by the second optical effect layer 17 can be very clearly observed. Accordingly, in this case, the display part DP1 and the display part DP3' can not be differentiated from each other or can be differentiated from each other with difficulty.

On the other hand, when the absolute value of the incident angle of the illumination light is relatively large, for example, the absolute value of the incident angle is 60° or more and less than 90°, only the display part DP1 of the display part DP1 and the display part DP3' displays a color corresponding to the diffracted light. That is, when the absolute value of the incident angle of the illumination light is relatively large, the display part DP1 and the display part DP3' can be differentiated from each other.

Namely, when the above configuration is adopted, a combination of the display part DP1 and the display part DP3' can form a latent image. Accordingly, when implemented like this, the forgery prevention effect of the display 10 and the printed matter 300 can be further enhanced.

As the material of the substrate 61, materials other than paper may be used. For example, as the material, a resin that has light-transmitting properties at least at a portion corresponding to the display 10 may be used. In this case, the display 10 may be buried inside of the substrate 61. Alternatively, when the light scattering property of the substrate 61 is small at least at a portion corresponds to the display 10, for example, when this portion is transparent, the display 10 may be fixed on a back surface of the substrate 61, that is, on a surface on a side opposite to a surface where a printed layer 61 is disposed.

The labeled article may not be a printed matter. That is, the display 10 may be supported by an article that does not contain a printed layer.

The display 10 may be used for purposes other than forgery prevention. For example, the display 10 may be used also as toys, learning materials, or ornaments.

EXAMPLES

Example 1

Firstly, as a support layer 45, a biaxially stretched PET film (PET FILM; E5100, manufactured by TOYOBO Co., Ltd.) having a thickness of 12 μm was prepared. Further, an ink having the following composition was prepared. This ink is referred to as an "ink 1".

Photopolymerizable nematic liquid crystal (PARIO-COLOR LC242, manufactured by BASF): 100 parts by mass Chiral agent (PARIOCOLOR LC756, manufactured by BASF): 4.8 parts by mass Polymerization initiator (IRGACURE 369, manufactured by Chiba Specialty Chemicals): 5 parts by mass Solvent (methyl ethyl ketone): 200 parts by mass Then, the ink 1 was applied to the biaxially stretched polyester film at a thickness of 5 μm. This was dried in a drying furnace at 120° C. to align liquid crystal molecules. Subsequently, in this state, using a high-pressure mercury vapor lamp of 120 W/cm, it was illuminated at 500 mJ/cm$^2$. Thus, a layer containing a cholesteric liquid crystal was cured and thereby a second optical effect layer 17 was obtained.

In the next place, an ink having the following composition was prepared. The ink is referred to as an "ink 2".

Two-component urethane ink (K448, manufactured by Toyo Ink Co., Ltd.): 100 parts by mass Isocyanate curing agent (UR100B, manufacture by Toyo Ink Co., Ltd.): 10 parts by mass Solvent (methyl ethyl ketone): 10 parts by mass Next, the ink 2 was applied by gravure coating on a second optical effect layer 17 at a thickness of 2 μm. After drying this, an aging process was applied at 40° C. for 3 days. Thus, a layer of a resin was obtained.

Subsequently, a nickel electrotype provided with a recess and/or protrusion structure was prepared. On the nickel electrotype, firstly, a region of a plurality of protrusions arranged two-dimensionally at a spatial frequency of 3000 lines/mm and individually having a forward-tapered shape was formed. Further, on the nickel electrotype, in the second place, 3 regions of grooves having spatial frequencies of 500 lines/mm, 1,000 lines/mm and 1,500 lines/mm were formed. The nickel electrotype was installed on a cylinder roll, and a hot-press embossing process was conducted against the layer of the resin. Thus, a first optical effect layer 12 provided with a first interface part IF1 and a second interface part IF2 was obtained.

Thereafter, on a main surface of the first optical effect layer 12 where the interface parts IF1 and IF2 were disposed, by use of a vacuum evaporation method, aluminum was deposited. In such a manner, a reflective material layer 13 having a thickness of 500 Å was obtained.

Subsequently, a reactive curing adhesive as an ink having the following composition was prepared. Hereinafter, the ink is referred to as an "ink 3".

Polyester resin (VYLON 240, manufactured by Toyobo Co., Ltd.): 100 parts by mass Block isocyanate (TPA-B80X, manufactured by Asahi Kasei Chemicals): 2 parts by mass Solvent (toluene): 100 parts by mass Solvent (methyl ethyl ketone): 100 parts by mass The reactive curing adhesive as the ink 3 was applied on the reflective material layer 13 by micro-gravure method at a thickness of about 10 μm. In such a manner, an adhesive layer 41 was obtained.

As described above, a transfer foil 200 with a display 10 was produced. The transfer foil 200 was pressed against a printed form of a gift certificate under heating at 160° C. for 10 second. Then, a PET film as a support layer 45 was peeled therefrom. Thus, a printed matter on which the display 10 was transferred was obtained.

Example 2

An ink having the following composition was prepared. Hereinafter, the ink is referred to as an "ink 4".

Vinyl chloride-vinyl acetate copolymer resin (SOLBIN A, manufactured by Nissin Chemical Industry Co., Ltd.): 100 parts by mass Cholesteric liquid crystal powder (HELICONE HC, SLM 90120, manufactured by LCP Technologies): 30 parts by mass Solvent (toluene): 250 parts by mass Solvent (methyl ethyl ketone): 250 parts by mass Then, a printed matter 300 including a display 10 was produced in the same manner as in Example 1 except that the ink 4 was used in place of the ink 1.

Example 3

As a second optical effect layer 17, a coextrusion multilayer film (TEIJIN TETRON FILM, MLF-13.0, manufactured by Teijin-DuPont Co., Ltd.) was prepared. Then, on the second optical effect layer 17, an ink 2 was applied by gravure method at a thickness of 2 μm. This was dried and aged at 40° C. over 3 days. Thus, a layer of a resin was obtained.

The nickel electrotype was installed on a cylinder roll, and an embossing process was applied under heating and pressure on the layer of resin. In such a manner, a first optical effect layer 12 provided with a first interface part IF1 and a second interface part IF2 was obtained.

Thereafter, on a main surface of the first optical effect layer 12 where the interface parts IF1 and IF2 were disposed, aluminum was deposited using vacuum evaporation. In such a manner, a reflective material layer 13 having a thickness of 500 Å was obtained.

Subsequently, using micro-gravure method, a reactive curing adhesive as an ink 3 was applied on the reflective material layer 13 at a thickness of about 10 μm. In such a manner, a sticky layer 30 was obtained.

Then, the resulted laminate was punched with a predetermined cutter. Thus, an adhesive label 100 with a display 10 was produced. The adhesive label 100 was attached under heating and pressure on a printed form of a gift certificate under condition of 160° C. for 10 sec. Thus, a printed matter 300 having a display 10 attached thereon was obtained.

Example 4

An ink having the following composition was prepared. Hereinafter, the ink is referred to as an "ink 5".

Vinyl chloride-vinyl acetate copolymer resin (SOLBIN A, manufactured by Nissin Chemical Industry Co., Ltd.): 100 parts by mass Pearl pigment powder (IRIODIN 231, manufactured by Merck): 30 parts by mass Solvent (toluene): 250 parts by mass Solvent (methyl ethyl ketone): 250 parts by mass Then, a printed matter 300 including a display 10 was produced in the same manner as that in Example 1 except that the ink 5 was used in place of the ink 1.

Example 5

Comparative Example

A printed matter including a display was produced in the same manner as in Example 1 except that a resin layer was formed in place of a first optical effect layer 12 by an embossing process including application of heat and pressure using a nickel electrotype which was provided with three regions including grooves arranged at spatial frequencies of 500 lines/mm, 1,000 lines/mm and 1,500 lines/mm.

Example 6

Comparative Example

Firstly, a layer containing a cholesteric liquid crystal was formed on a biaxially stretched PET film as a support layer in the same manner as that described in Example 1.

Then, on the layer containing the cholesteric liquid crystal, aluminum was deposited by vacuum evaporation. In such a manner, on the layer containing the cholesteric liquid crystal, a metal layer having a thickness of 500 Å was formed.

Subsequently, a mask ink having the following composition was prepared.

Hereinafter, the ink is referred to as an "ink 6".

Vinyl chloride-vinyl acetate copolymer resin (SOLBIN A, manufactured by Nissin Chemical Industry Co., Ltd.): 100 parts by mass Polyethylene wax (ADDITIVE 180, manufactured by Toyo Ink Co., Ltd.): 10 parts by mass Solvent (methyl ethyl ketone): 300 parts by mass On the metal layer, the ink 6 was pattern-printed by gravure method at a thickness of 2 μm.

Thereafter, the resulting laminate was dipped in an aqueous solution of 2% by mass sodium hydroxide at 50° C. over 5 sec. In such a manner, a portion of the metal layer that was covered with a mask layer was removed.

Subsequently, as a light-absorbing magnetic ink, an ink having the following composition was prepared. Hereinafter, the ink is referred to as an "ink 7".

Vinyl chloride-vinyl acetate copolymer resin (SOLBIN A, manufactured by Nissin Chemical Industry Co., Ltd.): 50 parts by mass Powder of magnetic substance (JEM-H, manufactured by Mitsubishi Materials Electronic Chemicals Co., Ltd.): 50 parts by mass Dispersant (DISPERBYK-106, manufactured by BYK Chemie): 3 parts by mass Isocyanate curing agent (UR100B, manufactured by Toyo Ink Co., Ltd.): 30 parts by mass Solvent (methyl ethyl ketone): 300 parts by mass The ink 7 was applied at a thickness of 4 μm on an entire surface of the metal layer and the resin layer by gravure coating. After drying this, aging was conducted at 60° C. for 7 days. In such a manner, a light-absorbing layer was formed.

On the light-absorbing layer, a reactive curing adhesive of an ink 3 was applied at a thickness of about 10 μm by micro-gravure. In such a manner, a transfer foil was obtained.

The transfer foil was pressed under heating against a printed form of gift certificate at 160° C. for 10 sec. Then, a PET film as a support layer was peeled therefrom. Thus, a printed matter including a display was obtained.

Example 7

Comparative Example

A laminate of a PET film as a support layer, a layer containing a cholesteric liquid crystal, and an embossed resin layer was produced in the same manner as that described in Example 5.

Next, on an embossed main surface of the resin layer, aluminum was deposited by vacuum evaporation. In such a manner, on the layer containing a cholesteric liquid crystal, a metal layer having a thickness of 500 Å was formed.

On the metal layer, an ink 6 was pattern printed by gravure coating at a thickness of 2 μm. Thus, a mask layer was obtained.

Thereafter, the resulting laminate was dipped in an aqueous solution of 2% by mass sodium hydroxide at 50° C. for 5 sec. In such a manner, a portion of the metal layer covered with the mask layer was removed.

Then, an ink 7 was applied on entire surfaces of the metal layer and the resin layer by gravure coating at a thickness of 4 μm. After drying this, an aging process was conducted at 60° C. for 7 days. In such a manner, a light-absorbing layer was formed.

On the light-absorbing layer, a reactive curing adhesive as an ink 3 was applied at a thickness of about 10 μm by micro-gravure coating. In such a manner, a transfer foil was obtained.

The transfer foil was pressed under heating against a printed form of gift certificate at 160° C. for 10 sec. Then, a PET film as a support layer was peeled therefrom. Thus, a printed matter including a display was obtained.

Example 8

Comparative Example

As a support layer, a biaxially stretched film (PET FILM; E5100, manufactured by Toyobo Co., Ltd.) having a thickness of 12 μm was prepared. Further, a hologram ink having the following composition was prepared. Hereinafter, the ink is referred to as an "ink 8".

Holographic powder (HOLOGRAM INK #256, manufactured by Jujo Chemical Co., Ltd.): 20 parts by mass Acrylic resin (BR60, manufactured by Mitsubishi Rayon Co., Ltd.): 100 parts by mass Solvent (toluene): 200 parts by mass Solvent (methyl ethyl ketone): 200 parts by mass The ink 8 was applied on the PET film at a thickness of 3 μm. After drying the resulting coating, an aging process was applied at 60° C. for 5 days to cure. In such a manner, a layer of holographic powder was formed.

On the layer of holographic powder, an ink 2 was applied by gravure coating at a thickness of 2 μm. After drying this, an aging process was conducted at 40° C. for 3 days. In such a manner, a resin layer was formed.

Then, using the same nickel electrotype as that used in Example 1, an embossing process was performed on one main surface of the resin layer. On the embossed main surface of the resin layer, aluminum was deposited by vacuum evaporation. In such a manner, on a layer containing a cholesteric liquid crystal, a metal layer having a thickness of 500 Å was formed.

Subsequently, on the metal layer, a reactive curing adhesive as an ink 3 was applied by micro-gravure coating at a thickness of about 10 μm. In such a manner, a transfer foil was obtained.

The transfer foil was pressed against a printed form of a gift certificate under heating at 160° C. for 10 sec. Then, a PET film as a support layer was peeled therefrom. Thereby, a printed matter including a display was obtained.

<Evaluation>

For each of the printed matters according to Examples 1 to 8, the following items were evaluated. These evaluation results are summarized in Table 1 below.

(Patterning Characteristics)

The printed matter was observed from a direction normal to a main surface of the display, and was evaluated whether or not it gave an appearance having a print pattern. The evaluation was conducted based on the following criteria.

S: A case where the pattern was very clearly observed.

A: A case where the pattern was clearly observed.

C: A case where the pattern was not observed.

(Positional Accuracy)

Evaluated was whether or not a position of a pattern corresponding to the recess structure and/or the protrusion structure provided on the first optical effect layer or the resin layer coincided with a position of a pattern visually recognized when the printed matter was observed from a direction normal to a main surface of the display. The evaluation was conducted based on the following criteria.

A: A case where positions of the patterns coincided.

C: A case where positions of the patterns did not coincide.

(Patterning Accuracy)

Evaluated was whether or not a pattern such as fine design and character could be displayed when the printed matter was observed from a direction normal to a main surface of the display. The evaluation was conducted based on the following criteria.

A: A case where a pattern such as fine design and character could be displayed.

C: A case where a pattern such as fine design and character could not be displayed.

(Overt Visibility)

Whether or not the authenticity check could be performed without using an instrument or device was evaluated. The evaluation was performed based on the following criteria.

A: A case where the authenticity check could be readily performed without using an instrument or device.

B: A case where the authenticity check could be performed without using an instrument or device.

C: A case where the authenticity check could not be performed without using an instrument or device.

(Wavelength Selectivity)

Evaluated was whether or not only a light having a specific wavelength could be selectively perceived when observed at a specific observation angle. The evaluation was performed based on the following criteria.

A: A case where only a light having a specific wavelength could be selectively perceived when observed at a specific observation angle.

C: A case where it was impossible that only a light having a specific wavelength was selectively perceived when observed at a specific observation angle.

(Polarization Change)

Evaluated was whether or not the polarization property changed from circular polarization to linear polarization when a direction from which the display was observed was gradually changed from the direction normal to a main surface of the display toward the wide angle side. The evaluation was performed based on the following criteria.

A: A case where the polarization property changed.
C: A case where the polarization property did not change.

(Cost)

The cost necessary for producing a printed matter was evaluated. The evaluation was performed based on the following criteria.

S: A case where production cost was low.
A: A case where production cost was slightly low.
C: A case where production cost was slightly high.

(Crack Resistance)

The crack resistance of a display was evaluated by use of an NBS crumpling device (manufactured by IGT Testing System) used in the crumpling test for banknotes.

A: A case where appearance change was hardly found.
B: A case where a few cracks were found.
C: A case where a lot of cracks were found.

TABLE 1

| Example | Patterning characteris | Positional accuracy | Patterning accuracy | Overt visibility | Wavelength selectivity | Polarization change | Cost | Crack resistance |
|---|---|---|---|---|---|---|---|---|
| 1 | S | A | A | A | A | A | A | B |
| 2 | A | A | A | B-A | A | A | A | B |
| 3 | A | A | A | B-A | A | C | S | A |
| 4 | A | A | A | B-A | C | C | A | B |
| 5 | C | — | — | C | C | C | A | B |
| 6 | A | C | C | A | A | C | C | B |
| 7 | A | C | C | C-A | C | C | C | B |
| 8 | C | — | — | C-A | C | C | A | B |

As is obvious from Table 1, in Examples 1 to 4, high forgery prevention effect could be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

LIST OF REFERENCE SYMBOLS

10 . . . Display
11 . . . Substrate
12 . . . First optical effect layer
13 . . . Reflective material layer
14$a$ . . . Groove
14$b$ . . . Recess or protrusion
15 . . . Light-transmitting layer
17 . . . Second optical effect layer
21 . . . Light-transmitting substrate
23 . . . Light-absorbing layer
25 . . . Adhesive layer
30 . . . Sticky layer
31$a$ . . . Illumination light
31$b$ . . . Illumination light
31$c$ . . . illumination light
32$a$ . . . Regularly reflected light
32$b$ . . . Regularly reflected light
32$c$ . . . Regularly reflected light
33$a$ . . . 1st-order diffracted light
33$b$ . . . 1st-order diffracted light
41 . . . Adhesive layer
43 . . . Release layer
45 . . . Support layer
60 . . . Printed matter body
61 . . . Substrate
62 . . . Print layer
100 . . . Adhesive label
200 . . . Transfer foil
300 . . . Printed matter
AP . . . Aperture
DP1 . . . Display part
DP1' . . . Display part
DP1A . . . Display part
DP1B . . . Display part
DP2 . . . Display part
DP2' . . . Display part
DP3 . . . Display part
DP3' . . . Display part
IF1 . . . First interface part
IF2 . . . Second interface part
IF3 . . . Third interface part

What is claimed is:

1. A display comprising:
a first optical effect layer including a first interface part, the first interface part being provided with recesses or protrusions arranged two-dimensionally at the minimum center-to-center distance in a range of 200 nm to 500 nm, each of the recesses or protrusions having a forward-tapered shape;
a reflective material layer covering at least a part of the first interface part; and
a second optical effect layer including, at a position of a first portion of the first interface part that is covered with the reflective material layer, a portion that faces the reflective material layer with the first optical effect layer interposed therebetween, the second optical effect layer containing at least one of a cholesteric liquid crystal, a pearl pigment and a multilayer interference film, wherein
the first optical effect layer further includes a second interface part as a flat surface that is adjacent to the first interface part,
the reflective material layer further covers a part of the second interface part so as to cross over a boundary between the first interface part and the second interface part, and the second optical effect layer is disposed so that an orthogonal projection of the second optical effect layer on a main surface of the first optical effect layer including the first interface part and the second interface part crosses over the boundary between the first interface part and the second interface part, the second optical effect layer has a first surface facing away from the reflective material layer, and the display is configured such that the reflective material layer reflects light incident perpendicularly on the first surface of the second optical effect layer only at a position of the second interface part to display an image which is selected from photographs, figures, paintings, characters or marks.

2. The display according to claim 1, wherein a first display part of the display that corresponds to the first interface part allows the observer to recognize a second optical effect offered by the second optical effect layer when observed at an angle capable of observing regularly reflected light, when an illumination light is incident at an angle within the negative angular range and the display is observed at an angle within the negative angular range, the first display part allows the observer to recognize the diffracted light from the first interface part, the display further comprises a dark light-absorbing layer facing the second optical effect layer with the first optical effect layer interposed therebetween at a position of a second portion of the second interface part not covered with the reflective material layer, the second optical effect layer further includes a portion that faces the first optical effect layer at the position of the second portion, and a combination of the first portion and the second portion forms a latent image that allows the observer to recognize the latent image when an absolute value of an incident angle of the illumination light is 60° or more and less than 90°.

3. The display according to claim 2, wherein the reflective material layer covers only a part of the first interface part, and the second optical effect layer further includes, at a position of a third portion of the first interface part that is not covered with the reflective material layer, a portion that faces the first optical effect layer.

4. The display according to claim 3, wherein the first optical effect layer has light-transmitting properties, and the light-absorbing layer is also present at a position of the second portion of the first interface part.

5. The display according to claim 4, wherein the light-absorbing layer contains a magnetic substance.

6. The display according to claim 2, wherein the first portion and the second portion are adjacent to each other.

7. The display according to claim 1, wherein a first display part of the display that corresponds to the first interface part allows an observer to recognize a second optical effect offered by the second optical effect layer when observed at an angle capable of observing regularly reflected light, when an illumination light is incident at an angle within the negative angular range and the display is observed at an angle within the negative angular range, the first display part allows the observer to recognize the diffracted light from the first interface part, the display further comprises a dark light-absorbing layer facing the second optical effect layer with the first optical effect layer interposed therebetween at a portion of the second interface part not covered with the reflective material layer, and the display further comprises a substrate layer on which the first optical effect layer is formed, the substrate layer and the first optical effect layer sandwiching the dark light-absorbing layer.

8. The display according to claim 7, wherein the reflective material layer covers only a part of the first interface part, and the second optical effect layer further includes, at a position of a second portion of the first interface part that is not covered with the reflective material layer, a portion that faces the first optical effect layer.

9. The display according to claim 8, wherein the first optical effect layer has light-transmitting properties, and the light-absorbing layer is also present at a position of the third portion of the first interface part.

10. The display according to claim 9, wherein the light-absorbing layer contains a magnetic substance.

11. A labeled article comprising:

a substrate; and the display according to claim 1 supported by the substrate.

12. The labeled article according to claim 11, wherein the substrate is a paper and the display is buried in the paper.

13. The labeled article according to claim 12, wherein the display is in a form of a thread.

\* \* \* \* \*